US012372041B2

(12) United States Patent
Koiwai et al.

(10) Patent No.: US 12,372,041 B2
(45) Date of Patent: Jul. 29, 2025

(54) CONTROL DEVICE FOR INTERNAL COMBUSTION ENGINE

(71) Applicant: Hitachi Astemo, Ltd., Hitachinaka (JP)

(72) Inventors: Ryutaro Koiwai, Hitachinaka (JP); Osamu Mukaihara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/711,914

(22) PCT Filed: Nov. 22, 2021

(86) PCT No.: PCT/JP2021/042754
§ 371 (c)(1),
(2) Date: May 21, 2024

(87) PCT Pub. No.: WO2023/089811
PCT Pub. Date: May 25, 2023

(65) Prior Publication Data
US 2025/0027460 A1 Jan. 23, 2025

(51) Int. Cl.
*F02D 45/00* (2006.01)

(52) U.S. Cl.
CPC ...... *F02D 45/00* (2013.01); *F02D 2200/0404* (2013.01)

(58) Field of Classification Search
CPC ............ F02D 45/00; F02D 2200/0404; F02D 2200/0406; F02D 2200/0408;
(Continued)

(56) References Cited

U.S. PATENT DOCUMENTS 7,831,371 B2 * 11/2010 Nishimura ....... F02M 35/10026 123/403
10,436,141 B2 * 10/2019 Watanuki ............. F02D 41/248
(Continued)

FOREIGN PATENT DOCUMENTS

JP 2006-138270 A 6/2006
JP 2015-90112 A 5/2015
(Continued)

OTHER PUBLICATIONS

International Preliminary Report on Patentability (PCT/IB/338 & PCT/IB/373) issued in PCT Application No. PCT/JP2021/042754 dated Jun. 6, 2024, including English translation of Written Opinion (PCT/ISA/237) (6 pages)
(Continued)

*Primary Examiner* — Logan M Kraft
*Assistant Examiner* — Johnny J Hoang
(74) *Attorney, Agent, or Firm* — Crowell & Moring LLP

(57) ABSTRACT

A processor (CPU 40*e*) of a control device (ECU 0) for an internal combustion engine identifies a first throttle valve opening degree $\theta_A$ and a second throttle valve opening degree $\theta_B$ at which a change rate (differential value) of an index (a deposit thickness, a decrease rate of an effective opening area, a flow rate decrease rate, and the like) correlated with a decrease rate of an effective opening area of a throttle valve changes (s109). The processor (CPU 40*e*) estimates an index at any throttle valve opening degree from the first throttle valve opening degree $\theta_A$ and the second throttle valve opening degree $\theta_B$ (s110), and calculates an effective opening area of the throttle valve from the estimated index (s112).

7 Claims, 13 Drawing Sheets

(58) Field of Classification Search
CPC ....... F02D 2200/1002; F02D 2200/101; F02D 2200/703; F02D 41/22; F02D 41/1405; F02D 2250/08; F02M 13/023; F02M 35/10222; F02M 2013/0083; F02M 2013/0088; F02M 2013/0094; F02M 2250/66
See application file for complete search history.

(56) References Cited

U.S. PATENT DOCUMENTS

| | | | | |
|---|---|---|---|---|
| 2005/0081823 | A1* | 4/2005 | Muto | F02D 41/18 123/350 |
| 2006/0005810 | A1* | 1/2006 | Araki | F02D 11/106 123/399 |
| 2006/0157024 | A1* | 7/2006 | Tomii | F02D 41/0002 123/346 |
| 2012/0303243 | A1* | 11/2012 | Momose | F02D 41/1402 701/102 |
| 2016/0237938 | A1 | 8/2016 | Nozaki | |
| 2016/0377004 | A1* | 12/2016 | Yokono | F02D 41/18 701/103 |
| 2020/0378329 | A1* | 12/2020 | Muto | F02D 41/22 |

FOREIGN PATENT DOCUMENTS

| | | | |
|---|---|---|---|
| JP | 2015-90138 | A | 5/2015 |
| JP | 2015-214925 | A | 12/2015 |
| JP | 2020-197173 | A | 12/2020 |

OTHER PUBLICATIONS

International Search Report (PCT/ISA/210) issued in PCT Application No. PCT/JP2021/042754 dated Dec. 28, 2021 with English translation (5 pages).
Japanese-language Written Opinion (PCT/ISA/237) issued in PCT Application No. PCT/JP2021/042754 dated Dec. 28, 2021 with English translation (7 pages).

* cited by examiner $$D(\theta_A) = D(\theta_C) = h_0(\theta_C) \times (1 - \frac{\mu A(\theta_1)}{\mu A_0(\theta_1)})$$

$$D(\theta_B) = D(\theta_D) = h_0(\theta_D) \times (1 - \frac{\mu A(\theta_1)}{\mu A_0(\theta_1)})$$

$$D(\theta_A) = D(\theta_1) = h_0(\theta_1) \times (1 - \frac{\mu A(\theta_1)}{\mu A_0(\theta_1)})$$

$$D(\theta_B) = D(\theta_2) = h_0(\theta_2) \times (1 - \frac{\mu A(\theta_2)}{\mu A_0(\theta_2)})$$

CONTROL DEVICE FOR INTERNAL COMBUSTION ENGINE

TECHNICAL FIELD

The present invention relates to a control device for an internal combustion engine.

BACKGROUND ART

For automobile exhaust gas regulations that have become increasingly strict year by year in order to reduce environmental loads, it is essential to increase the accuracy of techniques (air-fuel ratio control) for controlling an air-fuel ratio (a ratio of an amount of air to an amount of fuel in a cylinder) such that it is brought into an appropriate state. As a method for the air-fuel ratio control, there is a method of detecting an oxygen concentration in exhaust gas and correcting a fuel supply amount, and determining a fuel supply amount according to an intake flow rate detected by an intake flow rate sensor provided in an intake path.

Such a scheme is easily applied when there are no great changes in an operating state (a rotation speed and an output) of an internal combustion engine (steady state). On the other hand, under a transient operation condition such as rapid acceleration and rapid deceleration of an automobile, a gas flow rate at which a gas flows into the transiently changing cylinder (hereinafter referred to as an in-cylinder inflow gas flow rate) cannot be ascertained in accordance with the method. Therefore, the air-fuel ratio cannot be set sufficiently quickly under an appropriate condition.

Therefore, under the condition that an operation of an internal combustion engine is in a transient state, it is necessary to calculate an in-cylinder inflow gas amount using an intake measurement model and set an appropriate fuel injection amount so that a target air-fuel ratio is achieved. As a method of calculating an in-cylinder inflow gas flow rate of an internal combustion engine, there is a method of calculating an intake pipe pressure from an intake flow rate and a throttle valve passage gas flow rate calculated based on a throttle valve effective opening area of a throttle valve (hereinafter referred to as a throttle valve effective opening area), and calculating an in-cylinder inflow gas flow rate from the intake pipe pressure.

When a deposit is adhered to a body portion (hereinafter referred to as a throttle body) of the throttle valve of the internal combustion engine, a part of a cross section through which air can flow between the throttle valve and the throttle body is blocked due to the deposit. Therefore, the throttle valve effective opening area (an effective area of a cross section through which air can flow between the throttle valve and the body) decreases. Here, the deposit is sediment adhered, solidified, and accumulated on the throttle body due to unburned components of a blowby gas introduced into an intake air and fuel in an exhaust air.

When the throttle valve effective opening area is calculated without reflecting a deposit-accumulated state in an intake measurement model, an actual state cannot be reproduced with the throttle valve effective opening area calculated by the intake measurement model, and an error occurs. As a result, calculation errors of the throttle valve passage gas flow rate and the in-cylinder inflow gas flow rate occur. Therefore, it is necessary to reflect a change in the throttle valve effective opening area caused by deposit adhesion in the intake measurement model.

The related art discloses a technique for approximating a throttle valve effective opening area calculated using a learned value of an air flow rate under a steady operation condition at three different throttle valve opening degrees by a quadratic curve that has an opening degree as a variable to reflect a change in the throttle valve effective opening area due to deposit accumulation (see, for example, PTL 1).

PTL 1 discloses that, as three throttle valve opening degrees, a first throttle valve opening degree that is a throttle valve opening degree in a predetermined idle state, any second throttle valve opening degree less than the first throttle valve opening degree, and a predetermined third throttle valve opening degree that is greater than the first throttle valve opening degree and is not affected by a deposit accumulated near the throttle valve are used.

CITATION LIST

Patent Literature

PTL 1: JP 2015-214925 A

SUMMARY OF INVENTION

Technical Problem

Incidentally, in the technique of the related art, as disclosed in PTL 1, it is assumed that an interval increases between the first throttle valve opening degree and the third throttle valve opening degree. Therefore, when correction is performed to achieve a characteristic approximated to a predetermined quadratic curve, it cannot be said that a flow rate characteristic in a range of the first throttle valve opening degree and the third throttle valve opening degree, that is, a range of a throttle valve opening degree that is not affected by a deposit from the throttle valve opening degree in an idle state, is always corrected with high accuracy.

As a result, when the throttle valve opening degree changes by passing between the first throttle valve opening degree and the third throttle valve opening degree, a calculation error of a throttle passing gas flow rate in a transient state increases, and a large error occurs in a calculation amount of an in-cylinder inflow gas flow rate in the transient state. As a result, it is difficult to maintain an air-fuel ratio during a transient operation to a desired air-fuel ratio.

The present invention has been made in consideration of such circumstances. An object of the present invention is to provide a control device for an internal combustion engine capable of accurately calculating an effective opening area of a throttle valve in which an influence of a deposit is reflected.

Solution to Problem

In order to achieve the above object, a control device for an internal combustion engine includes a processor configured to identify first and second throttle valve opening degrees at which a change rate of an index correlated with a decrease rate of an effective opening area of a throttle valve changes; estimate the index at an arbitrary throttle valve opening degree from the first and second throttle valve opening degrees; and calculate an effective opening area of a throttle valve from the estimated index.

Advantageous Effects of Invention

According to the present invention, it is possible to accurately calculate an effective opening area of a throttle valve in which an influence of a deposit is reflected. Other problems, configurations, and effects will be clarified by the following description of embodiments.

DESCRIPTION OF EMBODIMENTS

Hereinafter, embodiments of the present invention will be described in detail with reference to the drawings. The present embodiment relates to a control device for an internal combustion engine that calculates an in-cylinder inflow gas flow rate of the internal combustion engine including a throttle valve in an intake path. An object of the present embodiment is to provide a control device for an internal combustion engine capable of accurately calculating a throttle valve effective opening area in a region where a throttle valve opening degree is equal to or greater than a throttle valve opening degree in an idle state, improving calculation accuracy of an in-cylinder inflow gas flow rate, and particularly maintaining an air-fuel ratio during a transient operation to a desired air-fuel ratio.

First Embodiment

Figure 1:
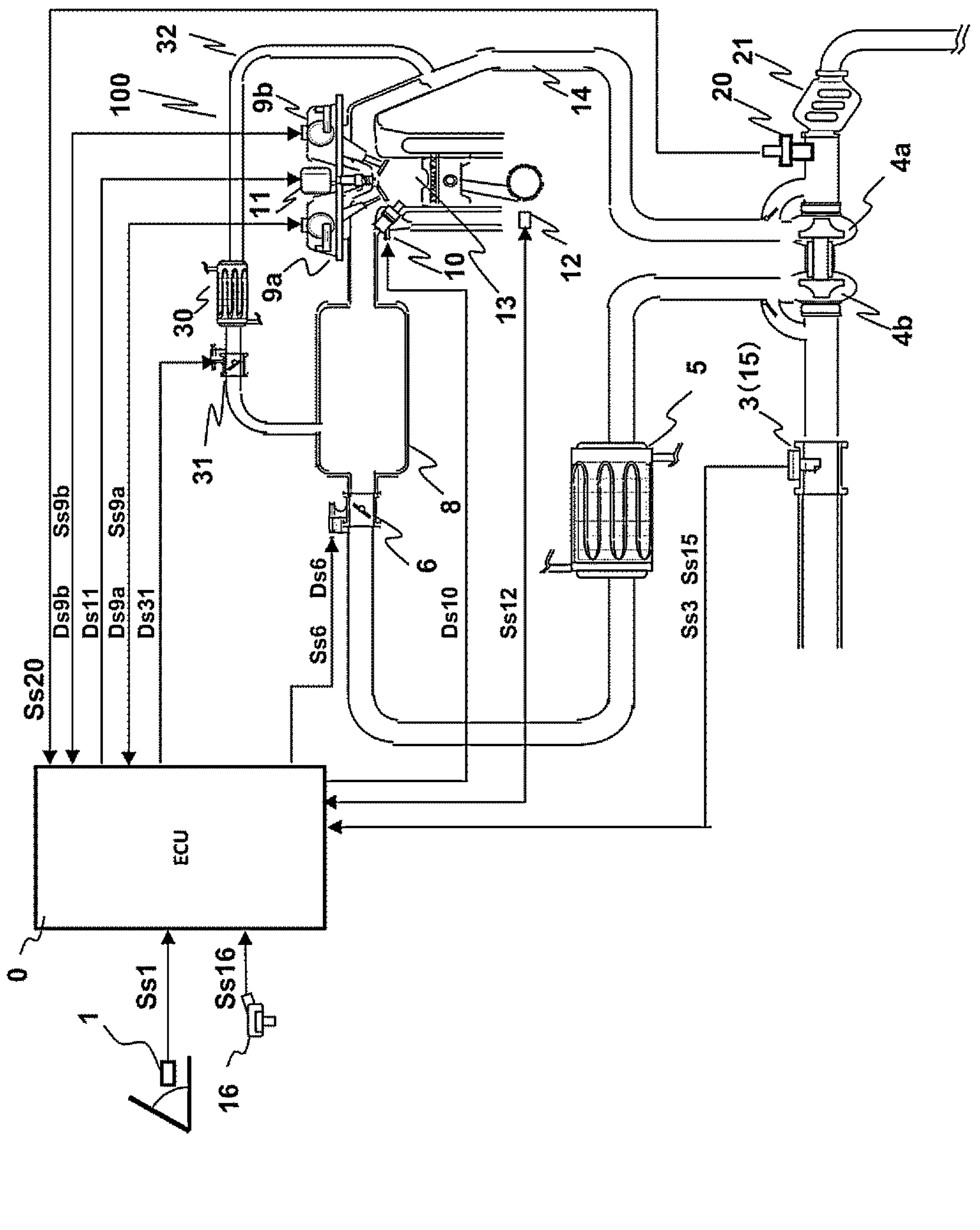
FIG. 1 is a system configuration diagram illustrating an automobile engine system according to a first embodiment of the present invention.

FIG. 1 is a system configuration diagram of an engine according to the present embodiment. This system configuration is common to all the following embodiments.

An engine 100 (internal combustion engine) is a spark ignition type internal combustion engine. An intake flow rate sensor 3 that measures an intake flow rate passing through an intake path of an engine, a compressor 4*b* of a supercharger that compresses an intake gas, an intercooler 5 that cools the intake gas, and a throttle valve 6 that adjusts the intake flow rate are provided at appropriate positions in an intake pipe 8. The intake flow rate sensor 3 contains an intake air temperature sensor 15 that detects an intake air temperature, and a throttle valve 6 contains a throttle position sensor that detects an opening degree of the throttle valve.

In the engine 100, a variable intake valve 9*a* that controls an opening/closing phase of an intake valve, a variable exhaust valve 9*b* that controls an opening/closing phase of an exhaust valve, a fuel injection device 10 that injects a fuel into a combustion chamber 13, an ignition plug 11 that supplies ignition energy, a crank angle sensor 12, and an atmospheric pressure sensor 16 that measures an atmospheric pressure are provided at appropriate positions of the engine 100. Each of the variable intake valve 9*a* and the variable exhaust valve 9*b* includes a phase sensor that detects an opening/closing phase.

Further, a turbine 4*a* that drives the compressor 4*b* using energy of the exhaust gas, a catalytic converter 21 that purifies the exhaust gas, and an air-fuel ratio sensor 20 that is a type of air-fuel ratio detector and detects an air-fuel ratio of the exhaust gas upstream from the catalytic converter 21 are provided at appropriate positions of the exhaust pipe 14. The air-fuel ratio sensor 20 may be an oxygen concentration sensor. An EGR pipe 32 for taking out EGR from upstream of the turbine 4*a* of the exhaust pipe 14 branches, and an EGR cooler 30 for cooling EGR and an EGR valve 31 for adjusting an EGR flow rate are provided at appropriate positions of the EGR pipe 32.

A detection signal (intake flow rate) Ss3 obtained from the intake flow rate sensor 3, a detection signal (throttle valve opening degree) Ss6 obtained from the throttle position sensor, opening/closing phase detection signals (an intake valve phase and an exhaust valve phase) Ss9*a* and Ss9*b* obtained from the phase sensors of the variable intake valve 9*a* and the variable exhaust valve 9*b*, a detection signal (rotation speed) Ss12 obtained from the crank angle sensor 12, a detection signal (atmospheric temperature) Ss15 obtained from the intake air temperature sensor 15, a detection signal (atmospheric pressure) Ss16 obtained from the atmospheric pressure sensor 16, and a detection signal Ss20 obtained from the air-fuel ratio sensor 20 are sent to an engine control unit (hereinafter referred to as an ECU) 0. A signal Ss1 obtained from an accelerator opening degree sensor 1 that detects a depression amount of the accelerator pedal, that is, an accelerator opening degree is sent to the ECU 0.

The ECU 0 calculates a required torque based on the output signal Ss1 of the accelerator opening degree sensor 1 and various sensor signals. That is, the accelerator opening degree sensor 1 is used as a required torque detection sensor that detects a required torque of the engine 100. The ECU 0 optimally calculates main operation amounts of the engine 100 such as an opening degree of the throttle valve 6, an injection pulse period of the fuel injection device 10, an ignition timing of the ignition plug 11, opening/closing timings of the variable intake valve 9*a* and the variable exhaust valve 9*b*, and an opening degree of the EGR valve 31 based on an operation state of the engine 100 obtained from outputs of the various sensors.

The fuel injection pulse period calculated by the ECU 0 is converted into a fuel injection device drive signal Ds10 (valve opening pulse signal) and sent to the fuel injection device 10. The opening degree of the throttle valve 6 calculated by the ECU 0 is sent as a throttle valve drive signal Ds6 to the throttle valve 6. Similarly, an ignition plug drive signal Ds11 is sent to the ignition plug 11. The opening degree of the EGR valve is sent as an EGR valve drive signal Ds31 to the EGR valve 31.

The air flowing from the intake pipe 8 to the combustion chamber 13 via the variable intake valve 9*a* is injected from the fuel injection device 10 through a fuel tank fuel pump (not shown) from a fuel tank (not shown) to form an air-fuel mixture. The air-fuel mixture is burned by a spark generated from the ignition plug 11 at a predetermined ignition timing, and a combustion pressure pushes down a piston to be turned into a driving force of the engine 100. The exhaust gas after combustion is sent to the catalytic converter 21 via the variable exhaust valve 9*b*, the exhaust pipe 14, and the turbine 4*a* and is discharged after NOx, CO, and HC components are removed by purification. Part of the exhaust gas is introduced into the intake pipe 8 via the EGR pipe 32, the EGR cooler 30, and the EGR valve 31.

Figure 2:
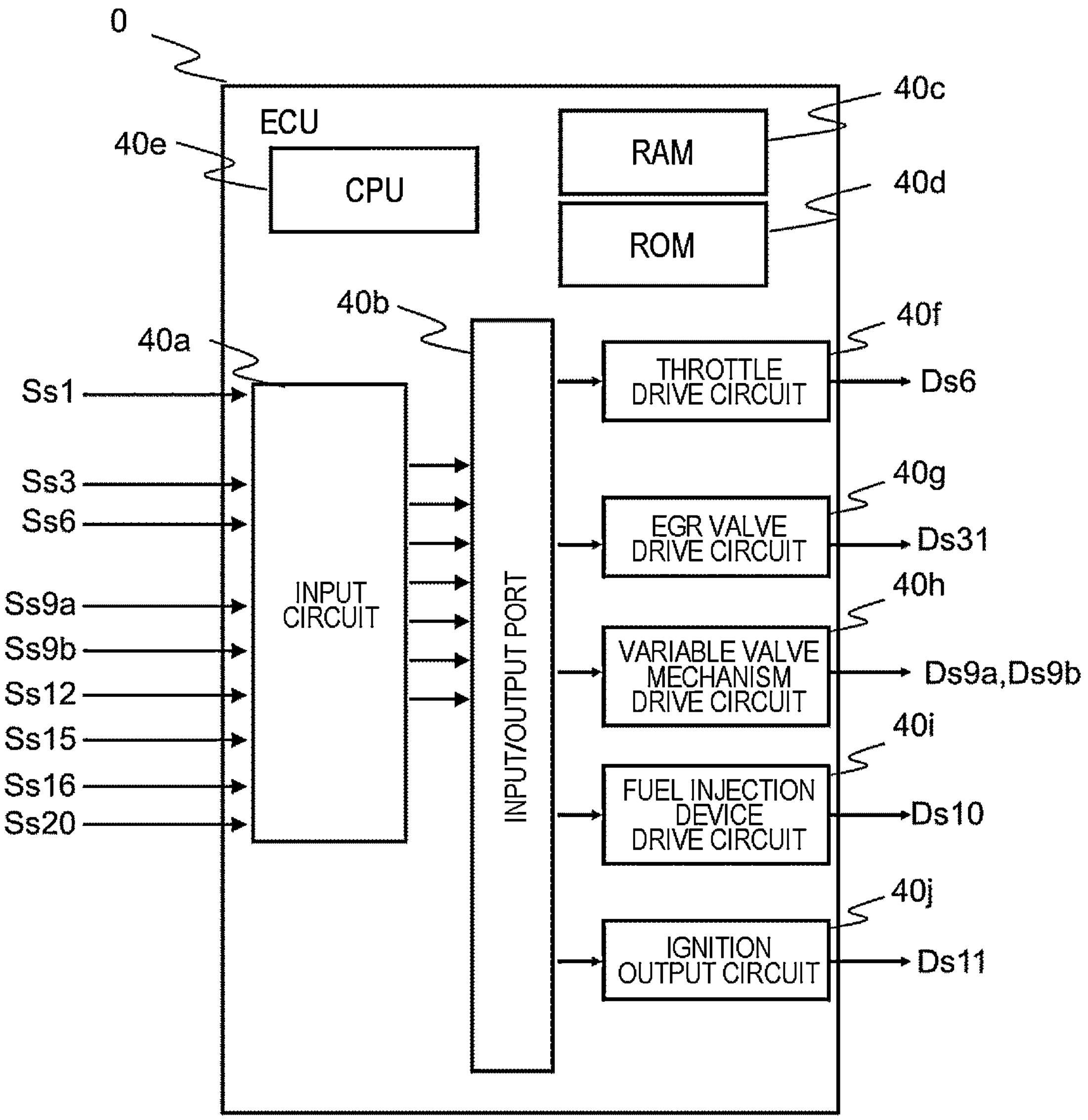
FIG. 2 is a system configuration diagram illustrating a configuration of an ECU according to the first embodiment of the present invention.

FIG. 2 is a system block diagram illustrating a configuration of an ECU 0 according to the embodiment of the present invention. The output signals of the accelerator opening degree sensor 1, the intake flow rate sensor 3, the phase sensors of the variable intake valve 9*a* and the variable exhaust valve 9*b*, the crank angle sensor 12, the intake air temperature sensor 15, the atmospheric pressure sensor 16, and the air-fuel ratio sensor 20 are input to an input circuit 40*a* of the ECU 0. However, input signals are not limited to these signals.

The input signal from each input sensor is sent to the input port in an input/output port 40*b*. Values of the input signals sent to the input/output port 40*b* are stored in a random access memory (RAM) 40*c* and are subjected to arithmetic processing by the CPU 40*e*. At this time, a signal including an analog signal among the input signals sent to the input circuit 40*a* is converted into a digital signal by an A/D converter included in the input circuit 40*a*.

A control program describing content of the arithmetic processing is written in advance in a read only memory (ROM) 40*d*. After a value indicating an operation amount of each actuator calculated by the control program is stored in the RAM 40*c*, the value is sent to an output port of the input/output port 40*b* and is sent to each actuator via each drive circuit. In the case of the present embodiment, a throttle drive circuit 40*f*, an EGR valve drive circuit 40*g*, a variable valve mechanism drive circuit 40*h*, a fuel injection device drive circuit 40*i*, and an ignition output circuit 40*j* are provided as drive circuits.

The drive circuits control the throttle valve 6, the variable valve 9, the fuel injection device 10, the ignition plug 11, and the EGR valve 31. Although the ECU 0 according to the present embodiment includes the drive circuits in the ECU 0, the present invention is not limited thereto, and any or all of the drive circuits may be provided outside of the ECU 0.

Figure 3:
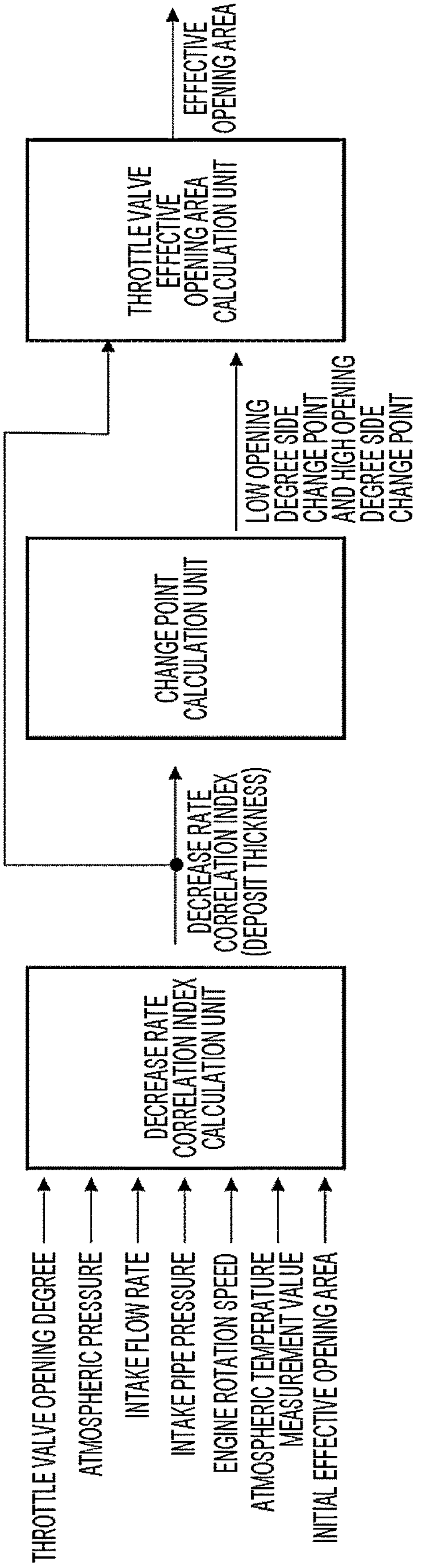
FIG. 3 is a block diagram illustrating calculation of a decrease rate correlation index, calculation of a change point of the decrease rate correlation index, and calculation of a throttle valve effective opening area according to the first embodiment of the present invention.

Hereinafter, an embodiment of the present invention will be described in detail with reference to FIGS. 3 to 13. FIG. 3 is a block diagram illustrating correction of a throttle valve effective opening area according to the present embodiment. An overview of the function of each block will be described below.

A decrease rate correlation index calculation unit acquires a learned value of a decrease rate correlation index based on various detection values including an atmospheric pressure, an intake flow rate, and an intake pipe pressure. In the present embodiment, a thickness of a deposit (deposit thickness) adhered to a throttle body will be described as a decrease rate correlation index, but the present invention is not limited thereto. For example, the throttle valve effective opening area decrease rate (a decrease rate of a throttle valve effective opening area after adhesion of a deposit to the throttle valve effective opening area in new state) or a flow rate decrease rate (a decrease rate of a flow rate after adhesion of a deposit to a flow rate when the valve is new under a reference condition) can be treated as the same index.

A change point calculation unit calculates a throttle valve opening degree (a low opening degree side change point and a high opening degree side change point) at which the deposit thickness changes, the throttle valve opening degree being necessary to calculate the deposit thickness at a learned value non-acquisition point. Here, the change point is calculated based on a differential value of the deposit thickness with respect to the throttle valve opening degree.

A throttle valve effective opening area calculation unit calculates a deposit thickness of the throttle valve opening degree at which a learned value of the deposit thickness is not acquired based on the low opening side change point and the high opening side change point, and calculates a throttle valve effective opening area of any throttle valve opening degree from the deposit thickness. A throttle valve upstream pressure and a throttle valve downstream pressure are calculated in a block (not illustrated).

First, before details of processing performed in each block are described, examples of formulae and calculation methods used for describing the present embodiment will be described. Next, specific processing of the present embodiment will be described.

First, examples of formulae and calculation methods used for describing the present embodiment will be described. The following formulas and calculation methods are merely exemplary. First, an overview of an example (I) of an intake system physical model that calculates an air behavior from a change in throttle valve opening degree to a change in in-cylinder inflow gas flow rate will be described, and a throttle valve passage gas flow rate (II) and an in-cylinder inflow gas flow rate (III) will be described.

(I) Basic Principle Of Intake System Physical Model

In the present embodiment, in the system illustrated in FIG. 1, a path from an intake port to an engine is divided into three control volumes (CV) of an exhaust pipe between a compressor and a throttle valve (hereinafter, this point is referred to as an upstream side of the throttle valve) and between the throttle valve and an intake manifold (hereinafter, this point is referred to as an intake pipe). A mass of a gas in each CV, energy or a mass flow rate passing through each CV, and an energy flow rate are calculated.

In the calculation, a pressure and a temperature are calculated from the mass and the energy of each CV based on the following basic equation using an intake flow rate detection value, an intake air temperature detection value, an atmospheric pressure detection value, a throttle valve opening degree detection value, an EGR valve opening detection value, an intake valve phase detection value, an exhaust valve phase detection value, a rotation speed detection value, a cooling water temperature detection value, a torque, and a mass flow rate and a temperature calculated at the previous calculation time.

[Math. 1]

$$\frac{dm}{dt} = \frac{dm_{in}}{dt} + \frac{dm_{out}}{dt} \tag{1}$$

[Math. 2]

$$\frac{dm \cdot e}{dt} = \frac{\kappa_{in} R_{in}}{\kappa_{in} - 1} T_{in} \cdot \frac{dm_{in}}{dt} - \frac{\kappa_{out} R_{out}}{\kappa_{out} - 1} T_{out} \cdot \frac{dm_{out}}{dt} - \frac{dQ}{dt} \tag{2}$$

[Math. 3]

$$P = \frac{m}{V} RT \tag{3}$$

[Math. 4]

$$T = \frac{\kappa \cdot 1}{R} e. \tag{4}$$

Here, m represents a mass [kg], e represents energy [J], T represents a temperature [K], kk represents a specific heat ratio [−], R represents a gas constant [J/(kg·K)], Q represents a heat transfer amount (wall surface heat loss amount) [J] to a wall surface with which the gas is in contact, V represents a volume [$m^3$], a subscript in represents an inflow to a CV, and a subscript out represents an outflow from a CV.

Next, a method of calculating a mass, energy, a temperature, and a pressure upstream of a throttle valve will be described. A throttle valve upstream gas mass $m_{Thr}$ is calculated by Formula (5) that is a formula obtained by discretizing Formula (1) based on an intake flow rate $dG_{AFS}$, a previous value of a throttle valve passage flow rate $dG_{Thr}$ to be described below, and a previous value of a throttle valve upstream gas mass.

[Math. 5]

$$m_{Thr}(n) = (dG_{AFS}(n) - dG_{Thr}(n-1)) \times dt + m_{Thr}(n-1) \tag{5}$$

A throttle valve upstream gas energy is calculated by Formula (6) that is a formula obtained by discretizing Formula (2) based on the throttle valve upstream gas mass $m_{Thr}$, an atmospheric temperature $T_{atm}$, a previous value of the throttle valve upstream temperature $T_{Thr}$, the intake flow rate $dG_{AFS}$ and previous values of the throttle valve passage gas flow rate $dG_{Thr}$.

[Math. 6]

$$e_{Thr}(n) = \left( \frac{\kappa_{atm} R_{atm}}{\kappa_{atm} - 1} T_{atm}(n) \cdot dG_{AFS}(n) - \frac{\kappa_{Thr} R_{Thr}}{\kappa_{Thr} - 1} T_{Thr}(n-1) \cdot dG_{Thr}(n-1) - \frac{dQ_c}{dt} \right) \times dt + e_{Thr}(n-1) \tag{6}$$

Here, for a specific heat ratio and a gas constant, a value of air in a standard state is used as a representative value. An intercooler cooling amount $dQ_c/dt$ is experimentally obtained in advance and is given as a constant.

A throttle valve upstream gas temperature is calculated by Formula (4) based on the throttle valve upstream gas energy, and the throttle valve upstream pressure is calculated by Formula (3) based on the throttle valve upstream gas temperature and the throttle valve upstream gas mass.

Next, a method of calculating a mass, energy, a temperature, and a pressure of an intake pipe gas will be described. An intake pipe gas mass $m_{mani}$ is calculated by Formula (7) that is a formula obtained by discretizing Formula (1) based on a throttle valve passage flow rate $dG_{Thr}$, a previous value of an in-cylinder inflow gas flow rate $dG_{cyl}$, and a previous value of an intake pipe gas mass to be described below.

[Math. 7]

$$m_{mani}(n) = (dG_{Thr}(n) - dG_{cyl}(n-1)) \times dt + m_{mani}(n-1) \tag{7}$$

The intake pipe gas energy is calculated by Formula (8) that is a formula obtained by discretizing Formula (2) based on the intake pipe gas mass $m_{mani}$, the throttle valve upstream temperature $T_{Thr}$, a previous value of the intake pipe temperature $T_{mani}$, the throttle valve passage gas flow rate $dG_{Thr}$, and a previous value of the in-cylinder inflow gas flow rate $dG_{cy}$l.

[Math. 8]

$$e_{mani}(n) = \left( \frac{\kappa_{Thr} R_{Thr}}{\kappa_{Thr} - 1} T_{Thr} \cdot dG_{Thr}(n) - \frac{\kappa_{mani} R_{mani}}{\kappa_{mani} - 1} T_{mani} \cdot dG_{cyl}(n-1) - \frac{dQ}{dt} \right) \times dt + e_{mani}(n-1) \tag{8}$$

Here, for a specific heat ratio and a gas constant, a value of air in a standard state is used as a representative value. A wall surface heat loss amount is experimentally obtained in advance to be given as a constant.

An intake pipe gas temperature is calculated by Formula (4) based on the intake pipe gas energy. An intake pipe pressure is calculated by Formula (3) based on the intake pipe gas temperature and the intake pipe mass. When a device detecting an intake pipe pressure is included, the detection value can also be used.

(II) Throttle Valve Passage Gas Flow Rate

Next, a method of calculating a throttle valve passage gas flow rate will be described. In the present embodiment, a throttle is regarded as an orifice, and a hydrodynamic model around the throttle is constructed to calculate a throttle valve passage gas flow rate. Here, the throttle valve passage gas flow rate is given by a flow rate formula in consideration of the following compressibility of a fluid based on an opening degree of the throttle valve and pressures before and after the throttle valve.

[Math. 9]

$$\left.\begin{aligned} dG_{Thr} &= \mu A p_{up}\sqrt{\frac{2}{RT_{up}}}\cdot\Psi(p_{up}, p_{dn}) && (9.1)\\ \Psi(p_{up}, p_{dn}) &= \left(\frac{2}{\kappa+1}\right)^{1/\kappa-1}\sqrt{\frac{\kappa}{\kappa+1}} && (9.2)\\ \frac{p_{dn}}{p_{up}} &< \left(\frac{2}{\kappa+1}\right)^{\kappa/\kappa-1} && (9.2.1)\\ \Psi(p_{up}, p_{dn}) &= \sqrt{\frac{\kappa}{\kappa+1}\left\{\left(\frac{p_{dn}}{p_{up}}\right)^{2/\kappa}-\left(\frac{p_{dn}}{p_{up}}\right)^{(\kappa+1)/\kappa}\right\}} && (9.3)\\ \frac{p_{dn}}{p_{up}} &\geq \left(\frac{2}{\kappa+1}\right)^{\kappa/\kappa-1} && (9.3.1)\end{aligned}\right\} \quad (9)$$

$dG_{Thr}$ represents a throttle valve passage gas flow rate [kg/s], μ represents a throttle valve effective opening area correction coefficient [–], A represents a throttle valve geometric opening area [$m^2$], Pup represents a throttle valve upstream pressure [Pa], Pdn represents a throttle valve downstream pressure [Pa], R represents a gas constant [J/(kg·K)], Tup represents a throttle valve upstream temperature [K], and ψ represents a flow rate coefficient [–]. A product of μ and A is an index called a throttle valve effective opening area [$m^2$]. Here, as the flow rate coefficient, one of the above Formulae (9.2) and (9.3) is selected in accordance with a pressure ratio Pdn/Pup between the throttle valve upstream pressure Pup and the throttle valve downstream pressure Pdn. Inequality (9.2.1) that is a condition of the ratio is called a sonic condition. Since a flow rate of passage via the valve becomes equal to a sound speed and a flow rate is saturated, a flow rate coefficient is given as a constant without depending on a pressure state. Inequality (9.3.1) that is a condition of a pressure ratio is a non-sonic condition, and the flow speed of passage via the valve is less than the sound speed.

(III) In-Cylinder Inflow Gas Flow Rate

Next, an in-cylinder inflow gas flow rate is calculated by the following method. Formula (10) indicates a calculation formula of an inflow gas flow rate into a cylinder.

[Math. 10]

$$dG_{cyl} = \eta\times Ne\times Vs\times\frac{n_{cyl}}{120}\times\frac{P_{mani}}{RT_{mani}} \quad (10)$$

$dG_{cyl}$ represents an in-cylinder inflow gas flow rate [kg/s], n represents the intake efficiency [–], Ne represents an engine rotation speed [rpm], Vs represents a stroke volume [$m^3$], Pmani represents an intake pipe pressure [Pa] downstream of a throttle valve, Tmani represents an intake pipe gas temperature [K], and ncyl represents the number of cylinders [–]. Intake efficiency is adapted in advance and is set in advance so that the intake efficiency can be searched for from an engine rotation speed, an intake pipe pressure, an intake valve phase, and an exhaust valve phase.

As described above, in the ECU 0, by repeating the calculations of (I), (II), and (III) described above at each determined calculation cycle, and accurately calculating a pressure from an upstream side of the throttle valve to a downstream side of a cylinder using a physical formula, it is possible to calculate an in-cylinder inflow gas flow rate in a transient condition that cannot be accurately measured by the intake flow rate sensor 3 with high response and high accuracy.

Next, a concept of a method of correcting a throttle valve effective opening area based on a deposit thickness that is a point of the present embodiment will be described with reference to FIGS. 4 to 10.

Figure 4:
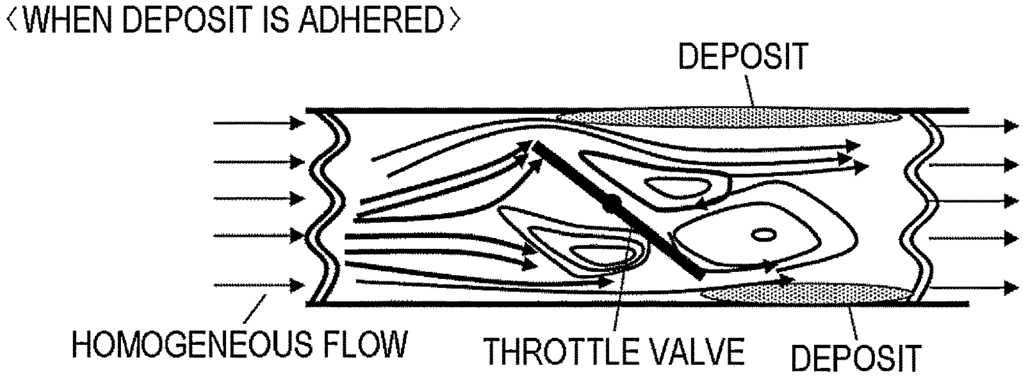
FIG. 4 is a diagram illustrating a flow state around a throttle valve when a deposit is adhered.

FIG. 4 illustrates a flow state around a throttle valve when a deposit is adhered. When the deposit is accumulated in the vicinity of the throttle valve, the flow path is blocked, and a throttle valve effective opening area decreases. When the throttle valve effective opening area is calculated without reflecting this state in the model, an error occurs between the calculated value of the throttle valve effective opening area and an actual state.

Figure 5:
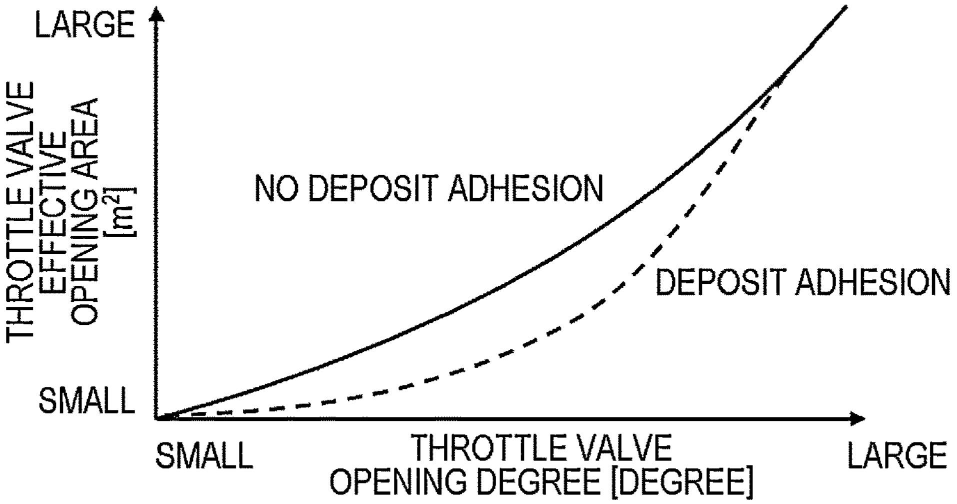
FIG. 5 is a diagram illustrating a relationship between a throttle valve opening degree and a throttle valve effective opening area.

FIG. 5 illustrates an effective opening area of a throttle valve assuming that a new throttle has no deposit adhered thereto and a throttle valve travels by a considerable amount and has a deposit attached thereto. A solid line indicates no deposit adhesion, and a broken line indicates deposit adhesion. As illustrated in FIG. 5, there is a range of the throttle valve opening degree in which the throttle valve effective opening area decreases due to deposit adhesion as compared with a case in which there is no deposit adhesion. Here, when the throttle valve opening degree increases, a ratio of an area closed by the deposit thickness to the throttle valve effective opening area decreases. Therefore, a change rate of the throttle valve effective opening area due to the deposit decreases as the throttle valve opening degree increases.

Figure 6:
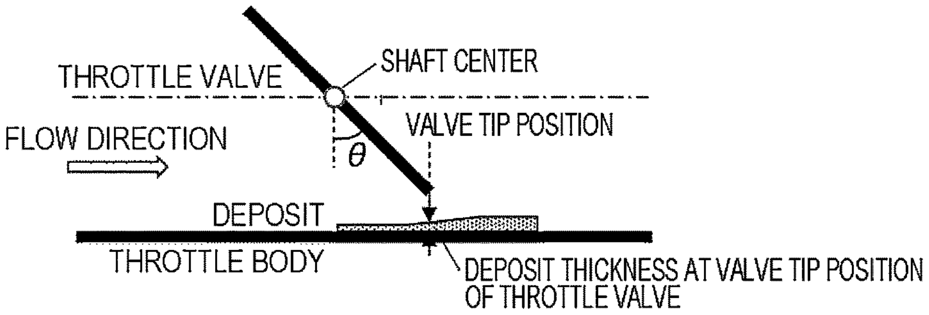
FIG. 6 is a diagram illustrating an image of deposit adhesion to a throttle body.

Next, characteristics of a deposit thickness distribution will be described. First, definition of the deposit thickness according to the present embodiment will be described. FIG. 6 is a diagram illustrating an image of deposit adhesion to a throttle body. Here, the throttle valve opening degree is θ [deg]. In the present embodiment, the deposit thickness at a valve tip position of the throttle valve at the time of setting of the throttle valve opening degree to θ is defined as a deposit thickness at the throttle valve opening degree θ.

Figure 7:
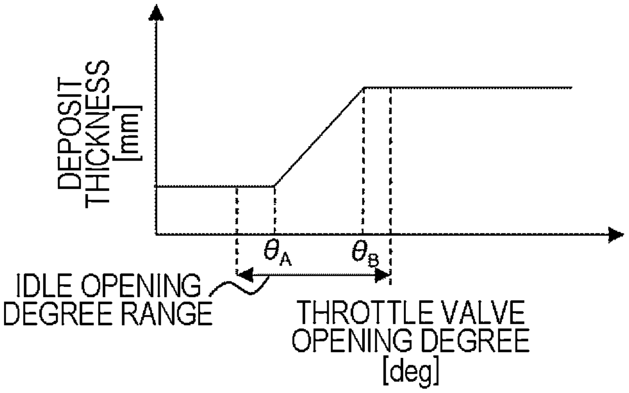
FIG. 7 is a diagram illustrating a measurement result of a deposit thickness distribution.

FIG. 7 illustrates an example of a deposit thickness distribution. The inventors of the present application have found characteristics of the deposit thickness distribution described in the following (A) to (C).

(A) The deposit thickness is constant in a range where the throttle valve opening degree is small (the throttle valve opening degree $\theta_A$ or less).

(B) The deposit thickness increases between the throttle valve opening degrees $\theta_A$ to $\theta_B$.

(C) The deposit thickness is constant in a range where the throttle valve opening degree is large (a range where the throttle valve opening degree is $\theta_B$ or more).

A gas temperature decreases due to adiabatic expansion of the gas when the gas passes via the throttle valve, and a temperature of a throttle body wall surface accordingly decreases. As a result, a mechanism is known in which blowby gas contained in intake air and high-boiling-point hydrocarbons derived from EGR gas are aggregated to form deposits and adhere to a throttle body. It is predicted that the characteristics (A) to (C) are achieved in the deposit adhered by such a mechanism.

In the present embodiment, a deposit accumulation influence is reflected using the characteristics (A) to (C) described above. Specifically, it is assumed that the deposit thickness is distributed in two stages in a flow direction. In this way, by assuming a deposit thickness distribution in the flow direction and calculating a deposit thickness at two points (for example, the throttle valve opening degrees $\theta_A$ and $\theta_B$) having thickness information of a two-stage distribution, the deposit thickness in a wide range in the flow direction can be calculated.

Details of the modeling will be described below.

Figure 8:
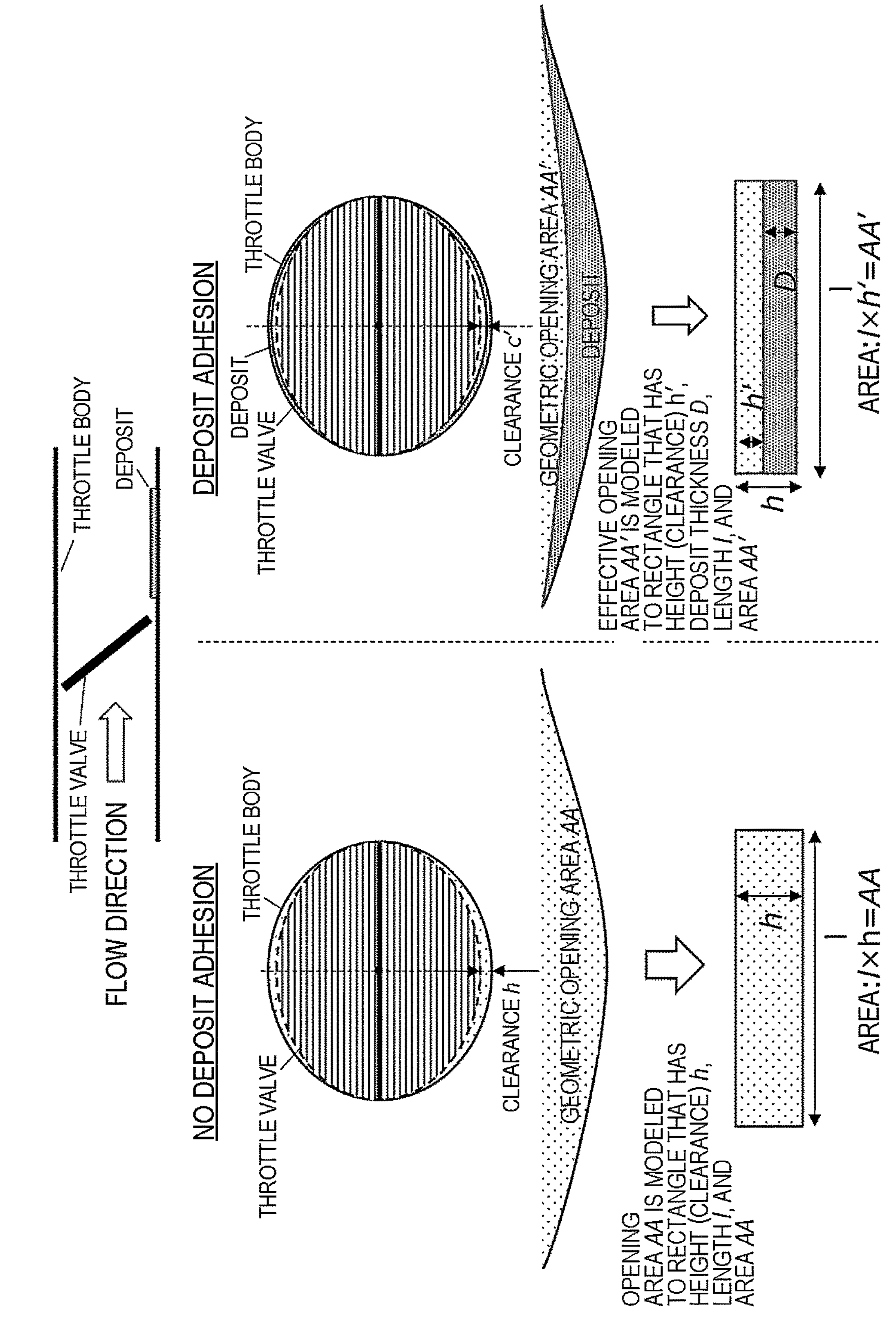
FIG. 8 is an image diagram illustrating modeling of a throttle valve opening area in consideration of deposit adhesion according to the first embodiment of the present invention.

FIG. 8 is an image diagram illustrating modeling of a throttle valve opening area in consideration of deposit adhesion. FIG. 8 is a view illustrating the throttle valve in the flow direction from the upstream side of the throttle valve. Here, a clearance between the throttle body and the throttle valve is set as a height, a rectangle having an area equal to the throttle valve opening area is considered as an equivalent opening surface, and a relationship between the equivalent opening surface and the deposit thickness is modeled.

FIG. 8 illustrates an equivalent opening surface in accordance with a deposit adhesion state. In the state in which there is no deposit adhesion, the equivalent opening surface has the same area as the throttle valve opening area AA [$m^2$], and is a rectangle that has a height h [m] and a length l [m]. When the deposit is adhered only to the throttle body (only to the lower side in the drawing), the equivalent opening surface has the same area as a throttle valve opening area AA' in the state of the deposit adhesion, and a rectangle having a height h' [m] and a length l [m] is set as the equivalent opening surface. The following relationships are established between the throttle valve opening area and the clearance and between the clearance and the deposit thickness.

[Math. 11]

$$RS = 1 - \frac{AA'}{AA} = 1 - \frac{l \times h'}{l \times h} = 1 - \frac{h'}{h} = \frac{D}{h} \tag{11}$$

[Math. 12]

$$D = h - h' \tag{12}$$

Here, D is a deposit thickness [m]. The decrease rate of the throttle valve opening area and the deposit thickness are related by Formulae (11) and (12). The geometric throttle valve opening area has been described above. Formula (11) is applied to learning assuming that this is also established for the throttle valve effective opening area. Specifically, Formula (13) is defined, and the deposit thickness can be calculated from the throttle valve effective opening area that can be acquired during traveling by Formula (13).

[Math. 13]

$$RS = 1 - \frac{\mu A'}{\mu A} = 1 - \frac{h'}{h} = \frac{D}{h} \tag{13}$$

In addition to the decrease rate of the throttle valve effective opening area, a flow rate decrease rate can also be used. In general, it is known that the intake flow rate is proportional to the throttle valve effective opening area under a sonic condition that a flow speed is the sound velocity. Therefore, the decrease rate of the throttle valve effective opening area and the flow rate decrease rate are equivalent. Therefore, in Formula (11), a flow rate decrease rate can be used as an alternative to the decrease rate of the throttle valve effective opening area.

Figure 9:
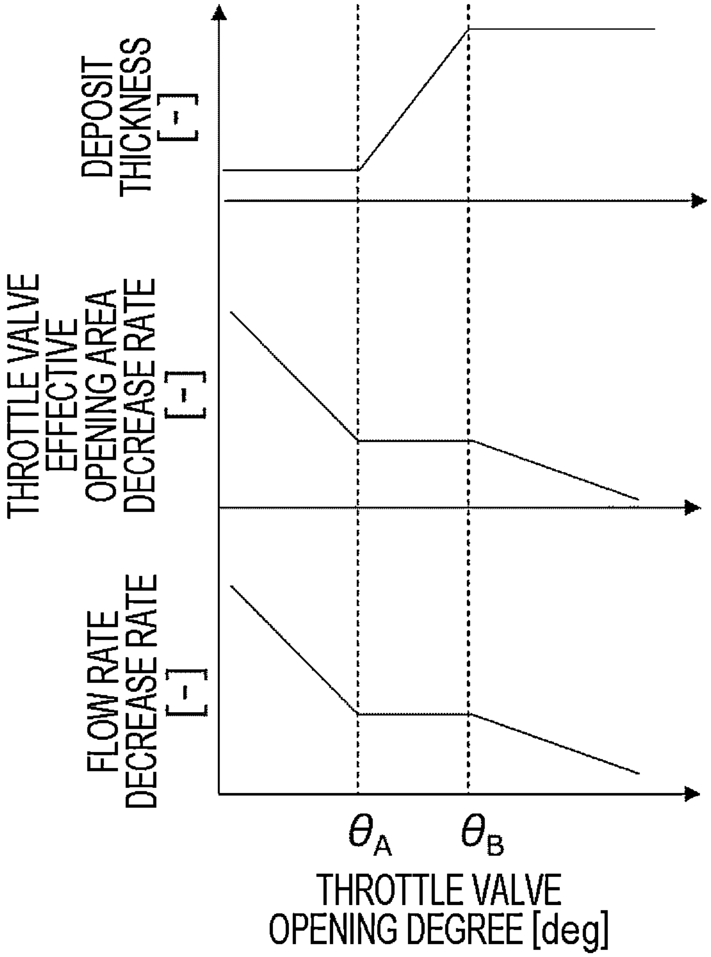
FIG. 9 is a diagram illustrating a relationship among a deposit thickness, a throttle valve effective opening area, and a flow rate decrease rate.

FIG. 9 illustrates the deposit thickness, the throttle valve effective opening area decrease rate, and the flow rate decrease rate. The throttle valve effective opening area decrease rate and the flow rate decrease rate tend to take constant values at a predetermined throttle valve opening degree. From this tendency, by defining $\theta_A$ and $\theta_g$ at two points at which the throttle valve effective opening area and the flow rate decrease rate are constant values, two points at which the deposit thickness changes can be extracted, and deposit thicknesses at the two points can be defined. Accordingly, the deposit thicknesses in a wide range of the flow direction can be defined based on limited information.

As described above, in calculation of the deposit thickness, it is necessary to calculate the throttle valve effective opening area. The throttle valve effective opening area can be calculated by Formula (14) derived from Formula (9) on the assumption that a throttle valve passage gas flow rate and an intake flow rate detection value $dG_{AFS}$ per unit time are equal in a steady state.

[Math. 14]

$$\mu A = \frac{dG_{AFS}}{p_{up}\sqrt{\frac{2}{R_{up}T_{up}}} \cdot \Psi} \tag{14}$$

From Formula (14), the throttle valve effective opening area can be calculated when an intake flow rate detection value, a throttle valve upstream pressure detection value, an intake air temperature detection value, an upstream temperature detection value, and an intake pipe pressure are input. Here, when there is no throttle valve upstream pressure sensor, the throttle valve upstream pressure detection value can be substituted with an atmospheric pressure detection value only under a non-supercharging condition.

In the present embodiment, since a learned value is acquired under a condition of a small throttle valve opening degree (a condition that a rotation speed is low and an engine load is small), the learned value is in an engine operation range that can be substituted with an atmospheric pressure detection value. Accordingly, even in a system that does not include means for obtaining a pressure upstream of the throttle valve, it is possible to obtain a detection value of the throttle valve upstream pressure under a non-supercharging condition. However, since a range that can be substituted with the atmospheric pressure detection value changes with a system configuration such as a method of controlling a wastegate or a method of controlling a variable displacement turbo, it is desirable to confirm the range in advance by a test or the like.

As described above, under the non-supercharging condition, the throttle valve effective opening area can be calculated when the intake flow rate detection value, the intake air temperature detection value, the atmospheric pressure detection value, and the intake pipe pressure are input to Formula (14). By using the detection value, it is possible to calculate a throttle valve effective opening area (hereinafter referred to as an actual throttle valve effective opening area) in which a change in the throttle valve effective opening area due to deposit adhesion is reflected. Accordingly, even when a deposit is adhered, the throttle valve effective opening area can be accurately calculated.

Figure 10:
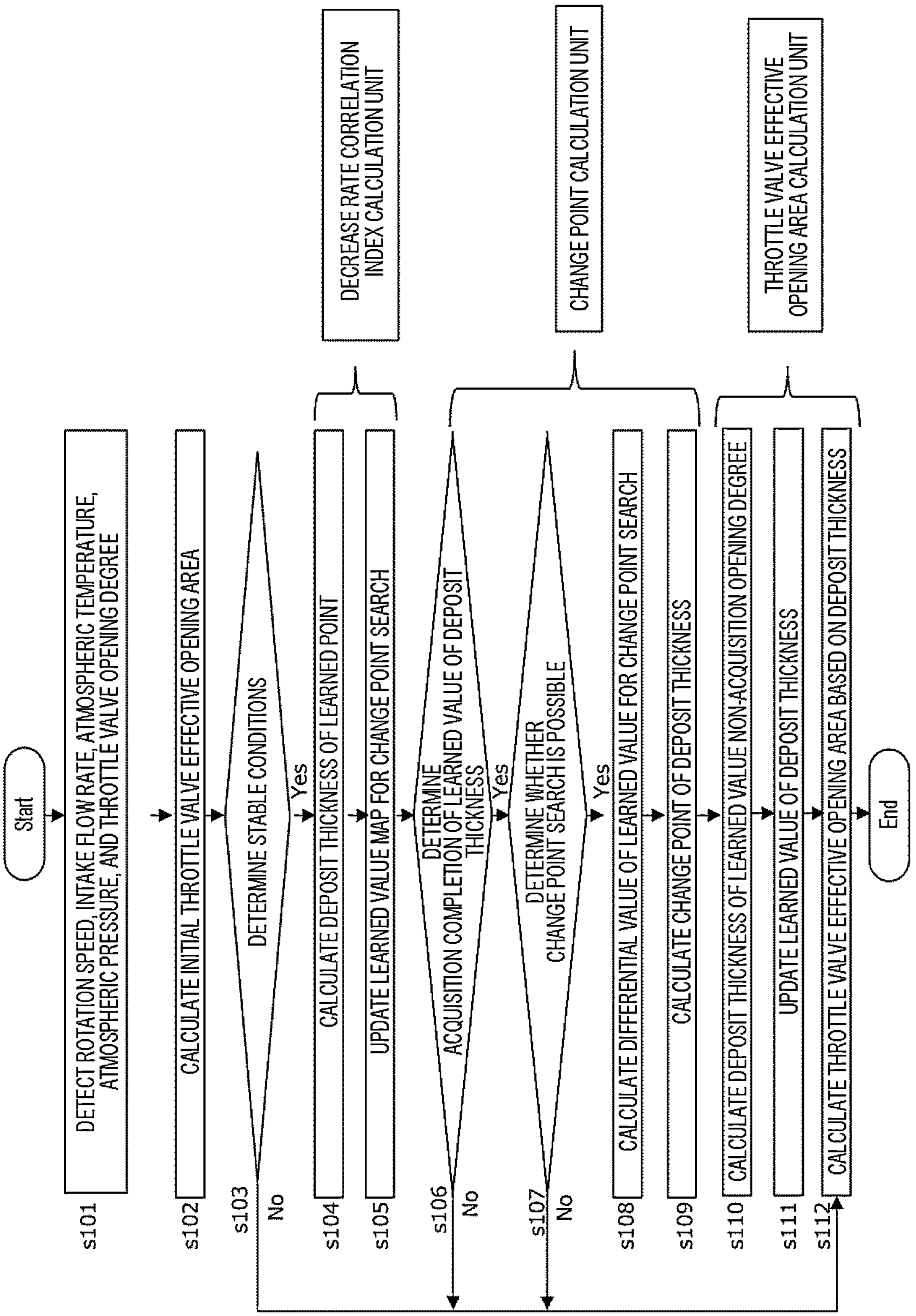
FIG. 10 is a flowchart illustrating learning of a deposit thickness and calculation of a throttle valve effective opening area according to the first embodiment of the present invention.

FIG. 10 is a flowchart illustrating calculation of the throttle valve effective opening area according to the present embodiment. Here, the entire logic including a logic for determining whether a predetermined condition is satisfied when the deposit thickness is learned will be described. Details of each step will be described below. Steps s101 to s103 are processed by a block not illustrated in FIG. 3, steps s104 and s105 are processed by the decrease rate correlation index calculation unit, steps s106 to s109 are processed by the change point calculation unit, and steps s110 to s112 are processed by the throttle valve effective opening area calculation unit.

<<Step s101>>

In step s101, a crank angle sensor, an intake flow rate sensor, an intake air temperature sensor, an atmospheric pressure sensor, and a throttle valve opening degree sensor detect the engine rotation speed, the intake flow rate, the intake air temperature, the atmospheric pressure, and the throttle valve opening degree, respectively.

<<Step s102>>

In step s102, an initial throttle valve effective opening area $\mu A_0$ [$m^2$] is calculated based on a table of the throttle valve opening degree and a throttle valve effective opening area (hereinafter initial throttle valve effective opening area) in a new throttle valve from which the throttle valve opening degree is set as an axis stored in advance. By forming a table for the throttle valve effective opening area in the new throttle valve in this way, it is possible to reduce a calculation load of the ECU.

<<Step s103>>

In step s103, it is determined whether all the following three conditions are satisfied, and it is determined whether to start deposit learning.

(A1) The rotation speed is equal to or less than a threshold.

(A2) The engine load is equal to or less than a threshold.

(A3) The throttle valve opening degree is steady.

For (A1) and (A2), a scheme of comparing the rotation speed and the engine load with the thresholds is adopted. Accordingly, it is determined whether the non-supercharging condition is satisfied. Here, it is necessary to set the thresholds to be in a range that can be determined as a non-supercharging range and to define a range where the throttle valve upstream pressure is less than a predetermined value as compared with the atmospheric pressure in advance by an experiment. Accordingly, since the atmospheric pressure detection value can be used as the throttle valve upstream pressure, the actual throttle valve effective opening area can be calculated with high accuracy and erroneous learning can be prevented. When the throttle valve upstream pressure sensor is provided, a throttle valve upstream pressure sensor detection value can be used.

For (A3), a scheme of comparing a difference value between a value a predetermined time before the throttle valve opening degree and a current value with a threshold is adopted. Here, the threshold depends on a relationship between a change amount of the throttle valve opening degree and a change amount of the throttle valve effective opening area, but can be defined as, for example, a change amount of the throttle valve opening degree in which the change amount of the throttle valve effective opening area falls within a predetermined range. Accordingly, since it is possible to determine whether the throttle valve opening degree is steady, learning can be performed under a stable condition and erroneous learning can be prevented.

When the learning start determination (s103) is No, the process proceeds to step s112. When the determination is Yes, the process proceeds to step s104.

<<Step s104>>

In step s104, a learned value of a deposit thickness at a detected throttle valve opening degree 0 is calculated. Here, the deposit thickness is calculated by Formula (15) based on a relationship indicating that the throttle valve effective opening area decrease rate is equal to a clearance decrease rate.

[Math. 15]

$$D(\theta) = h_0(\theta)\times\left(1-\frac{\mu A(\theta)}{\mu A_0(\theta)}\right) \tag{15}$$

Here, D is a deposit thickness [m], $h_0$ is a distance (hereinafter referred to as an initial clearance) [m] between the throttle body and the tip of the throttle valve in a new throttle body, and $\mu A$ is an actual throttle valve effective opening area [$m^2$]. Here, the initial clearance can be geometrically determined from the opening degree of the throttle valve and a diameter of the throttle valve.

In the present embodiment, the initial clearance is stored in advance in the ECU as a table in which the throttle valve opening degree is set as an axis. Accordingly, the calculation load of the ECU can be reduced. By calculating the deposit thickness in this way, it is possible to calculate a learned value of the deposit thickness at the throttle valve opening degree θ with high accuracy.

<<Step s105>>

Figure 11A:
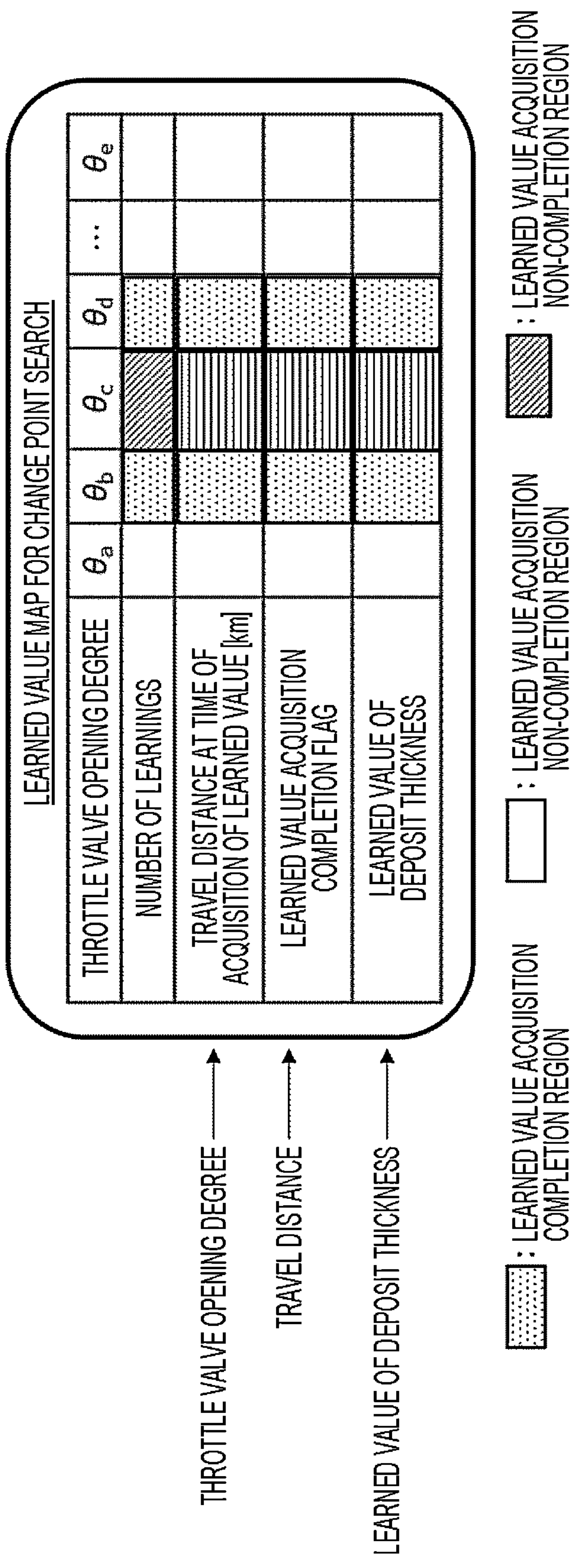
FIG. 11A is a diagram illustrating a learned value map for change point search according to the first embodiment of the present invention.

In step s105, the learned value of the deposit thickness, the number of learnings, and a travel distance at the time of acquisition of the learned value are updated to a learned value map for change point search. FIG. 11A illustrates a learned value map for change point search. In the map, the number of learnings, the travel distance at the time of acquisition of the learned value, a learned value acquisition completion flag, the learned value of the deposit thickness, and a learned value of a deposit thickness for change point search are recorded using the throttle valve opening degree as a grid point. The initial value of the map is set to 0 for all variables. In general, an influence of a deposit on the throttle valve effective opening area is usually large at a low opening degree, and the influence decreases as the throttle valve opening degree increases. Therefore, for example, by defining the grid point within a range affected by the deposit, it is possible to reduce a storage area used by the ECU.

In step s105, the map is updated using a value obtained by weighted-averaging the calculated learned value of the deposit thickness and the learned value of the deposit thickness held in the map as a learned value of a new deposit thickness. Since the learned value of the deposit thickness of the map gradually changes using the weighted average, it is possible to suppress erroneous learning even when the learned value rapidly changes, for example, an instantaneously abnormal value is input. Whenever the process of s105 is performed, the map is updated by adding the number of learnings by 1 with respect to a previous value of a corresponding portion of the map.

<<Step s106>>

In step s106, when the number of times the learned value is acquired and the travel distance at the time of acquisition of the learned value satisfy the following predetermined conditions, it is determined that the acquisition of the learned value of the throttle valve opening degree θ is completed, and a learned value acquisition completion flag of the learned value map for change point search is updated. Here, in the learned value acquisition completion flag, 1 indicates acquisition completion and 0 indicates non-acquisition.

(B1) The number of times the learned value is acquired is equal to or greater than a threshold.

(B2) A difference between the travel distance at the time of acquisition of the learned value and a current travel distance is less than a threshold.

For (B1), a scheme of comparing the number of times the learned value is acquired with the threshold is adopted. By providing a threshold for the number of times the learned value is acquired, it is possible to determine whether the learned value can be acquired a sufficient number of times. For (B2), a scheme of comparing a difference between the travel distance at the time of acquisition of the learned value and the current travel distance with a threshold is adopted. In general, the deposit thickness increases as the travel distance increases. Therefore, a timing at which the learned value is acquired is important in order to guarantee reliability of the learned value.

For example, when the throttle valve effective opening area decreases by about 1% in travel of 100 km and it is considered to detect a change of 2% in the throttle valve effective opening area, the threshold is set to about 200 km. Since the learned value of sufficiently learned and relatively new information can be used by (B1) and (B2), the reliability of the learned value is improved and erroneous learning can be prevented.

When the acquisition completion determination of the deposit thickness learned value (s106) is No, the process proceeds to step s112. When the determination is Yes, the process proceeds to step s107.

<<Step s107>>

In step s107, it is determined whether the change point search of the deposit thickness is possible. The throttle valve opening degree for checking whether there is the learned value is set to $\theta_C$ or more and $\theta_D$ or less. In the present embodiment, $\theta_C$ and $\theta_D$ are set in advance so that the low opening degree side change point $\theta_A$ and the high opening degree side change point $\theta_B$ assumed by a preliminary test or idle opening degree setting are included in the range of $\theta_C$ or more and $\theta_D$ or less.

When the learned value acquisition completion flag is 1 at least at one point in the range of $\theta_C$ or more and $\theta_D$ or less, it is determined that the change point search is possible. By setting the determination condition, it is possible to promptly reflect the determination condition in the calculation of the throttle valve effective opening area without waiting for completion of acquisition of the learned value under other conditions when the learned value of the deposit thickness can be acquired.

When the change point searchable determination (s107) is No, the process proceeds to step s112. When the determination is Yes, the process proceeds to step s108.

<<Step s108>>

In step s108, a differential value of the learned value of the deposit thickness is calculated. Here, the learned value of the deposit thickness recorded in the change point search learning map is substituted into Formula (16), and a differential value of the deposit thickness for the throttle valve opening degree is calculated.

[Math. 16]

$$\frac{dD}{d\theta}(\theta) = \frac{D\left(\theta + \frac{\alpha}{2}\right) - D\left(\theta - \frac{\alpha}{2}\right)}{\left(\theta + \frac{\alpha}{2}\right) - \left(\theta - \frac{\alpha}{2}\right)} \tag{16}$$

Here, a is a differential interval [deg] (where a is an even number). For example, when it is considered that the change in the deposit thickness in increments of 1 deg of the throttle valve opening degree is calculated, x is set to 2 deg.

<<Step s109>>

In step s109, a change point of the deposit thickness is calculated. In the present embodiment, a point at which the differential value of the deposit thickness is equal to or greater than the threshold is set as a change point. Here, the throttle valve opening degree at which the differential value calculated in step s108 is equal to or greater than a threshold $L_1$ is searched for. A smallest opening degree satisfying the same condition is denoted by $M_{min}$. A largest opening degree is denoted by $M_{max}$. It is assumed that $M_{min}$ is the same as $M_{max}$ when there is one opening degree satisfying the same condition. The opening degrees obtained by Formulae (17) and (18) are defined as a low opening degree side change point $\theta_A$ [deg] and a high opening degree side change point $\theta_B$ [deg]. By performing the processing in this way, it is possible to calculate the low opening degree side change point and the high opening degree side change point with high accuracy from the opening degrees of which acquisition of the learned value of the deposit thickness is completed.

[Math. 17]

$$\theta_A = M_{min.} - \frac{\alpha}{2} \tag{17}$$

[Math. 18]

$$\theta_B = M_{max} + \frac{\alpha}{2} \tag{18}$$

However, in the range of the throttle valve opening degree $\theta_C$ or more and $\theta_D$ or less, the low opening degree side change point, the high opening degree side change point, and the deposit thickness are determined as follows when the number of grid points at which acquisition of the learned value of the deposit thickness is completed is as follows.

(i) When the number of grid points is 1.

The low opening degree side change point is denoted by $\theta_C$ (where $\theta_A=\theta_C$), and the high opening degree side change point is denoted by $\theta_D$ (where $\theta_B=\theta_D$). Based on the throttle valve effective opening area decrease rate that tends to take a constant value in the range of the throttle valve opening degree $\theta_A$ or more and $\theta_B$ or less, the deposit thickness at the low opening degree side change point and the high opening degree side change point is calculated by the following Formulae (19) and (20). Here, a grid point at which the acquisition of the learned value of the deposit thickness is completed is denoted by $\theta_1$ (see FIG. 11B). Accordingly, even when the condition that the acquisition of the acquisition of the learned value of the deposit thickness is completed is one point, the low opening degree side change point, the high opening degree side change point, and the deposit thickness can be defined.

[Math. 19]

$$D(\theta_A) = h_0(\theta_A) \times \left(1 - \frac{\mu A(\theta_1)}{\mu A_0(\theta_1)}\right) \tag{19}$$

-continued

[Math. 20]

$$D(\theta_B) = h_0(\theta_B) \times \left(1 - \frac{\mu A(\theta_1)}{\mu A_0(\theta_1)}\right) \tag{20}$$

(ii) When the number of grid points is two.

Figure 11B:
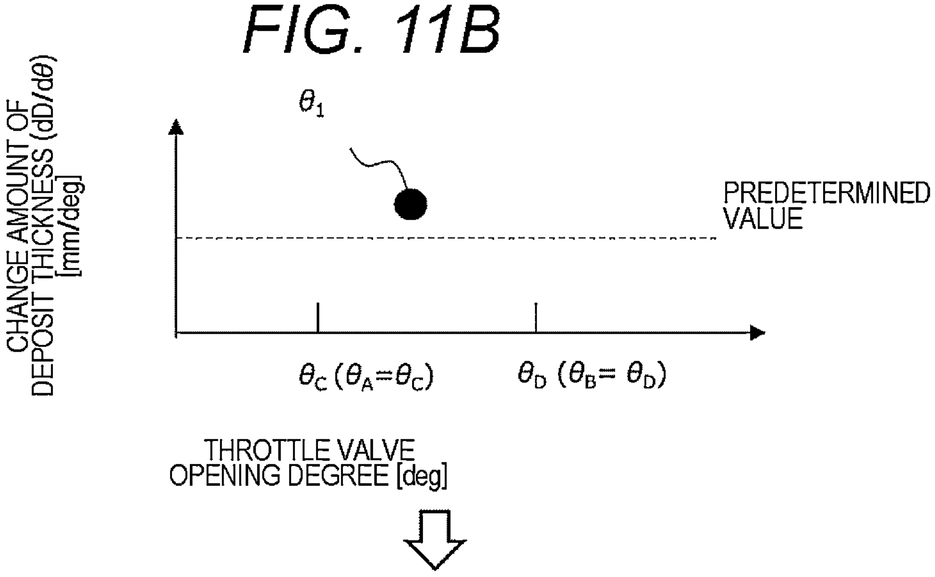
FIG. 11B is a diagram illustrating a method of determining a low opening degree side change point, a high opening degree side change point, and a deposit thickness when the number of grid points is 1.
Figure 11C:
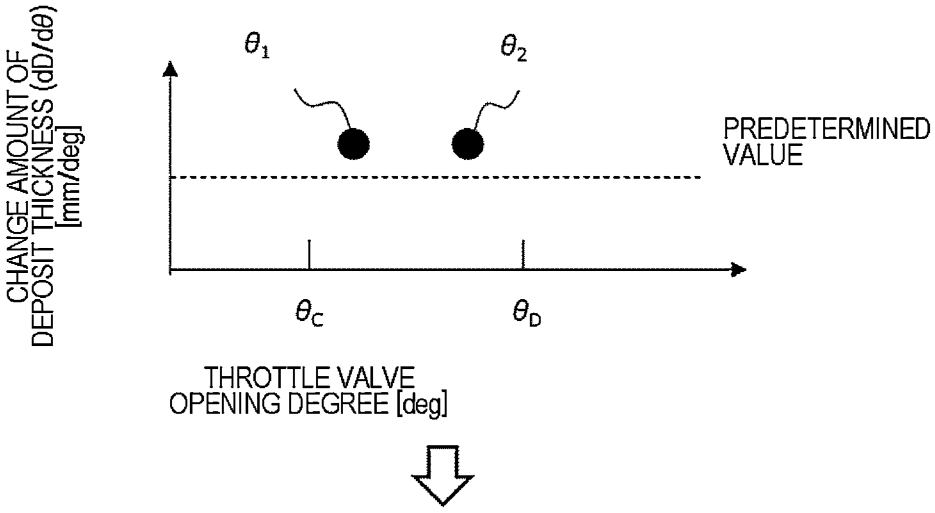
FIG. 11C is a diagram illustrating a method of determining a low opening degree side change point, a high opening degree side change point, and a deposit thickness when the number of grid points is 2.

Among grid points at which the acquisition of the learned value of the deposit thickness is completed in the range of the throttle valve opening degree $\theta_C$ or more and $\theta_D$ or less, a grid point $\theta_1$ having a small throttle valve opening degree is set as a low opening degree side change point, and a grid point $\theta_2$ having a large throttle valve opening degree is set as a high opening degree side change point (see FIG. 11C). As the deposit thickness, a value acquired by learning is used. Accordingly, it is possible to define the low opening degree side change point, the high opening degree side change point, and the deposit thickness even when the condition that the acquisition of the learned value of the deposit thickness is completed is two points.

<<Step s110>>

In step s110, the deposit thickness of the opening degree for which the learned value of the deposit thickness has not been acquired is calculated. Here, based on a distribution of the deposit thickness in two stages, the deposit thickness of the learned value non-acquisition opening degree of the deposit thickness is calculated by Formula (21).

[Math. 21]

$$\left.\begin{array}{l} \text{(i) if } \theta < \theta_A \\ \qquad D(\theta) = D(\theta_A) \\ \text{(ii) if } \theta_A \leqq \theta \leqq \theta_B \\ \qquad D(\theta) = (1-C)D(\theta_A) + CD(\theta_B)(\theta_A < \theta < \theta_B) \\ \qquad C = (\theta - \theta_A)/(\theta_B - \theta_A) \\ \text{(iii) if } \theta_B < \theta \\ \qquad D(\theta) = D(\theta_B) \end{array}\right\} \tag{21}$$

According to (i), the deposit thickness in the range of the throttle valve opening degree less than the low opening side change point at which the learned value of the deposit thickness cannot be acquired can be calculated with high accuracy. According to (ii), the deposit thickness in the throttle valve opening degree range from the low opening degree side change point or more at which the learned value of the deposit thickness cannot be acquired and the high opening degree side change point or less can be calculated with high accuracy. According to (iii), the deposit thickness in the throttle valve opening range greater than the high opening side change point at which the learned value of the deposit thickness cannot be acquired can be calculated with high accuracy.

<<Step s111>>

In step s111, the learned value of the deposit thickness of the learned value non-acquisition opening degree of the deposit thickness is updated to the change point search learned value map.

<<Step s112>>

In step s112, the throttle valve effective opening area of any throttle valve opening degree is calculated based on the deposit thickness. Here, the throttle valve effective opening area is calculated by Formula (22).

[Math. 22]

$$\mu A(\theta) = \mu A_0(\theta) \times \left(1 - \frac{D(\theta)}{h(\theta)}\right) \tag{22}$$

Accordingly, it is possible to accurately calculate the throttle valve effective opening area in a region where the throttle valve opening degree is equal to or greater than the throttle valve opening degree in the idle state.

Figure 12:
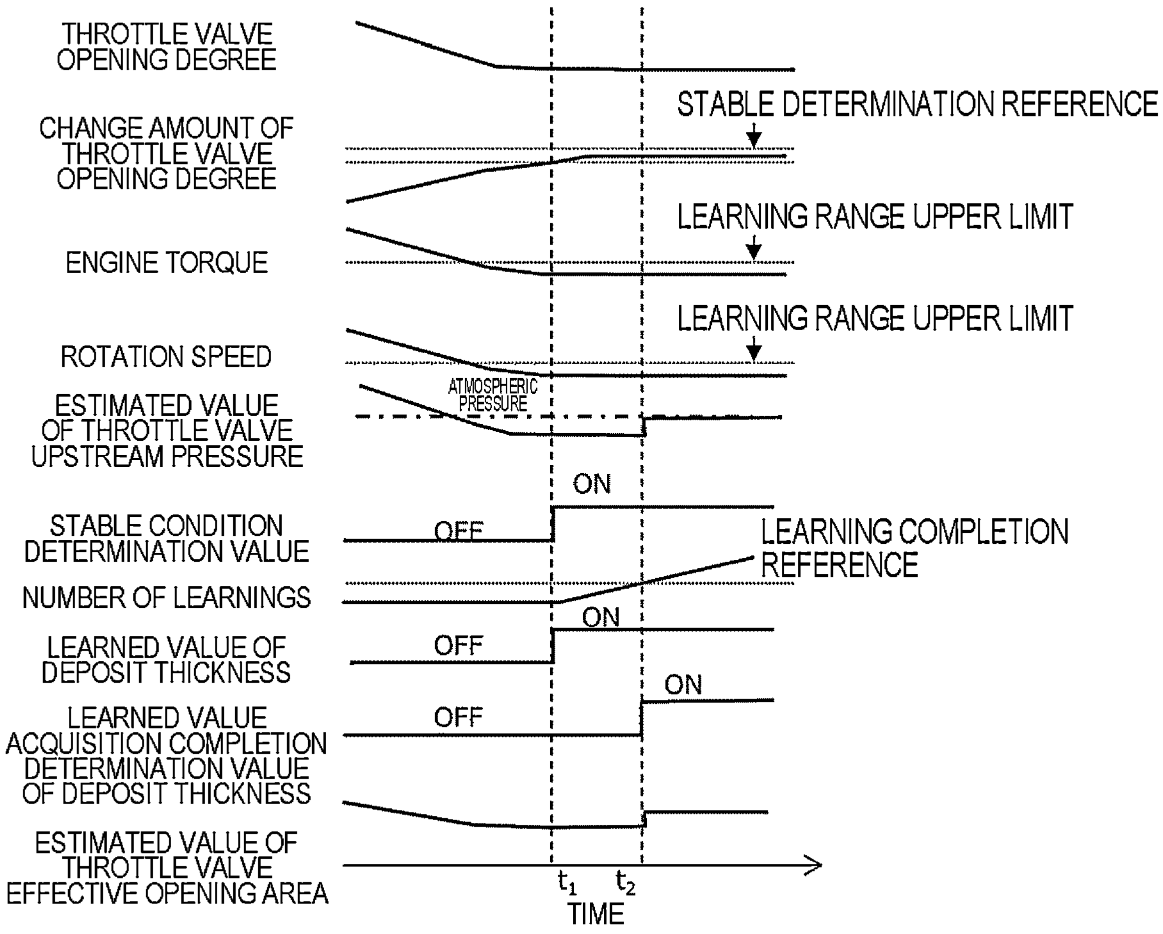
FIG. 12 is a time chart when deposit thickness learning is performed according to the first embodiment of the present invention.

FIG. 12 is a time chart when deposit thickness learning is performed at the time of deceleration as an example in the present embodiment. The vertical axis represents a throttle valve opening degree, a change amount of the throttle valve opening degree, an engine torque, a rotation speed, a throttle valve upstream pressure calculation value, a stable condition determination value, the number of learnings, a learned value of the deposit thickness, a learned value acquisition completion determination value of the deposit thickness, and a calculation value of the throttle valve effective opening area from the above, and the horizontal axis represents time.

In FIG. 12, after the engine torque and the rotation speed are within a learning condition range (the range is indicated by a dotted line), it is determined that the throttle valve opening degree becomes stable when a change amount of the throttle valve opening degree reaches a predetermined value range (less than a steady state determination reference value indicated by a dotted line).

Time t1 is a time at which the three conditions are satisfied and a flag for stable condition determination (stable condition determination value) is turned on. Acquisition of a learned value of the deposit thickness starts at time t1. The number of learnings increases and exceeds a learning completion reference at time t2, and the flag for the learned value completion determination of the deposit thickness is turned on. Accordingly, the throttle valve effective opening area calculation value is corrected. The throttle valve upstream pressure calculation value increases and matches the atmospheric pressure through the correction.

Figure 13:
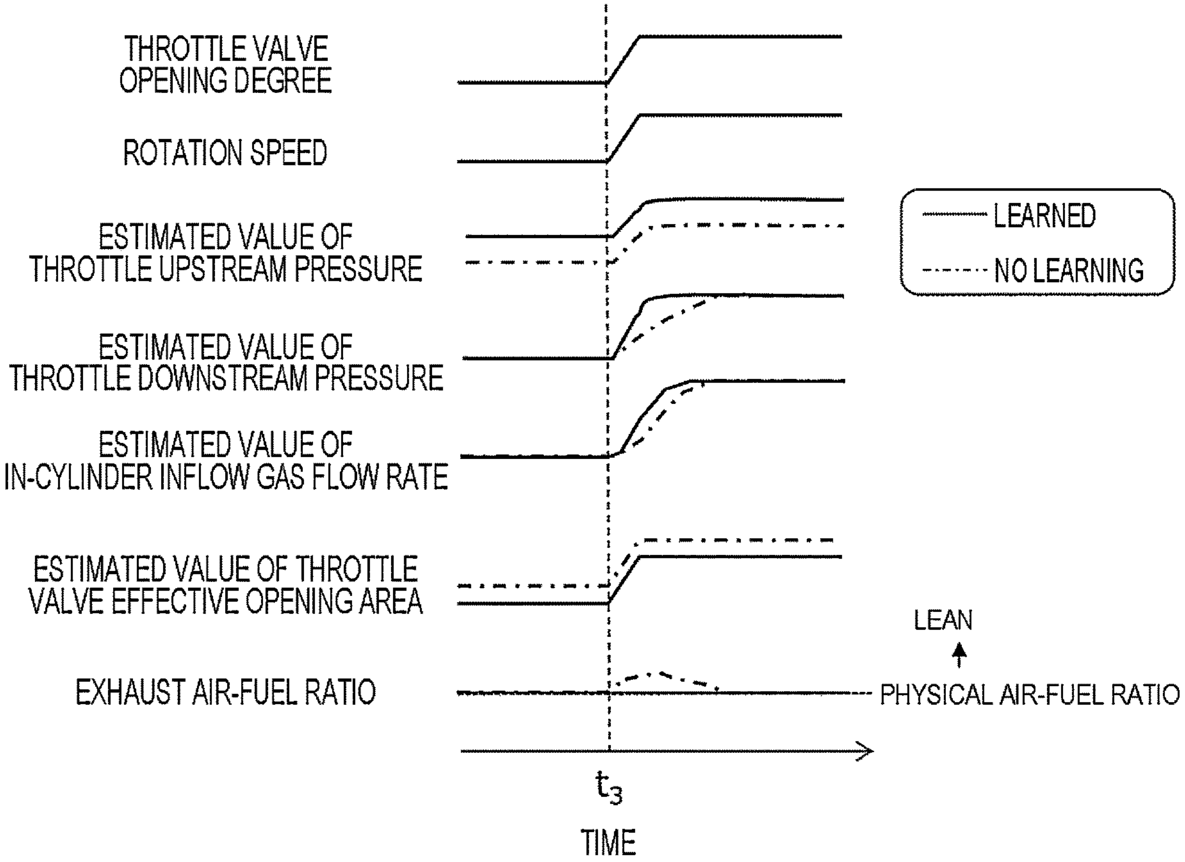
FIG. 13 is a diagram illustrating time charts at the time of acceleration in a case in which deposit thickness learning has been performed and a case in which there is no learning according to the first embodiment of the present invention.

FIG. 13 is a time chart at the time of acceleration in a case in which deposit thickness learning has been performed and in a case in which deposit thickness learning has not been performed in the present embodiment. The vertical axis represents a throttle valve opening degree, a rotation speed, a calculated value of a throttle valve upstream pressure, a calculated value of a throttle valve downstream pressure, a calculated value of an in-cylinder inflow gas flow rate, a calculated value of a throttle valve effective opening area, and an exhaust air-fuel ratio, and the horizontal axis represents time. A solid line indicates learning completion, and a broken line indicates a non-learning.

Acceleration starts at time t3. In a case of non-learning, an exhaust air-fuel ratio becomes lean at the time of acceleration. In the case of learning completion, the exhaust air-fuel ratio does not fluctuate. This is because even when deposit is adhered, the throttle valve effective opening area is corrected by learning, and the in-cylinder inflow gas flow rate can be calculated with high accuracy. Accordingly, an appropriate fuel injection amount can be controlled, which can prevent deterioration in fuel consumption and exhaust emission.

As described above, according to the present embodiment, when a predetermined learning condition is established, an index correlated with a decrease rate of the throttle valve effective opening area is calculated based on the opening degree of a throttle valve provided in an intake path of an internal combustion engine, a rotation speed of the internal combustion engine, an amount of intake air passing through the throttle valve, an upstream pressure of the throttle valve, a downstream pressure of the throttle valve, and an atmospheric temperature. A change point of the index is determined based on a change amount of the index with respect to the throttle valve opening degree. The throttle valve effective opening area is calculated based on the change point of the index.

Accordingly, even when a deposit is adhered to the throttle body, the throttle valve effective opening area can be calculated with high accuracy. Accordingly, since the in-cylinder inflow gas flow rate during a transient operation can be calculated with high accuracy, an appropriate fuel injection amount can be controlled, which can prevent deterioration in fuel consumption and exhaust emission.

Second Embodiment

In a second embodiment, a method of acquiring a learned value of a deposit thickness under a desired throttle valve opening degree condition by operating an intake valve closing timing and an exhaust valve closing timing when a deposit is adhered to a throttle body will be described.

As described in the first embodiment, in order to calculate the change point of the deposit thickness, it is necessary to acquire the learned value of the deposit thickness at a plurality of opening degrees in the idle opening degree range. The present embodiment has been devised in view of this circumstance. In the second embodiment to be described below, the configurations described in the first embodiment are applied to configurations other than differences from the first embodiment.

First, a method of operating an intake valve and an exhaust valve at a closing timing and a method of operating a throttle valve opening degree according to the present embodiment will be described. Next, specific processing of the present embodiment will be described.

Figure 14:
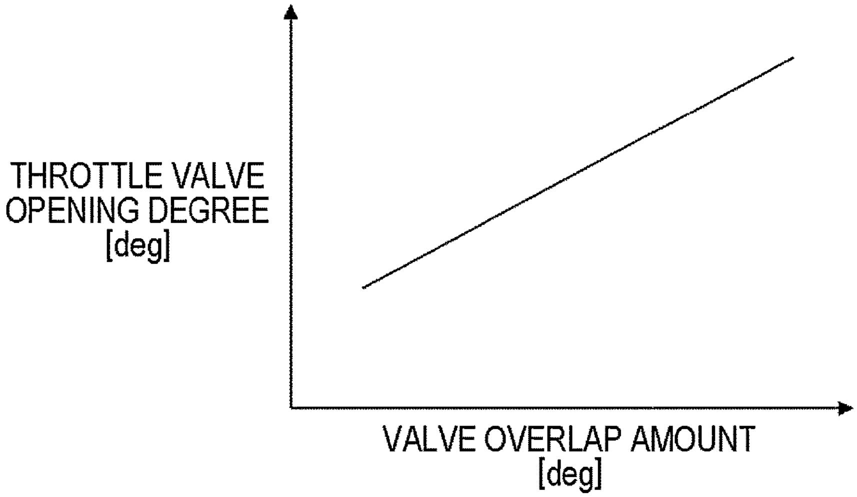
FIG. 14 is a diagram illustrating a relationship between a valve overlap amount and a throttle valve opening degree under conditions that a rotation speed is constant and an output is constant.

First, a method of operating the intake valve and the exhaust valve at the closing timing and a method of operating the throttle valve opening degree according to the present embodiment will be described. FIG. 14 is a diagram illustrating a relationship between a valve overlap amount and a throttle valve opening degree for achieving constant output under a condition that a rotation speed is constant. Here, the valve overlap amount is a period in which both the intake valve and the exhaust valve are simultaneously opened.

As a method of changing the valve overlap amount, a variable valve mechanism is operated and the intake valve or the exhaust valve is operated, and an opening timing of the intake valve is set to be advanced from a closing timing of the exhaust valve. As illustrated in FIG. 14, under the condition that a rotation speed is constant and an output is constant, the valve overlap amount and the throttle valve opening degree have a positive correlation. Here, when the rotation speed is constant, a combustion gas (internal EGR gas) carried over to a next cycle increases by increasing the valve overlap amount. As a result, if the throttle valve opening degree is not operated, an intake flow rate decreases. In order to keep the intake flow rate constant, it is necessary to increase the throttle valve opening degree.

By operating the variable valve mechanism and the throttle valve opening degree so that the valve overlap amount and the throttle valve opening degree have the positive correlation in this way, it is possible to set various throttle valve opening degrees. Accordingly, it is possible to acquire a learned value of the deposit thickness while preventing deterioration in drivability at various throttle valve opening degrees. Further, for example, by setting a combination of the variable valve mechanism and the throttle valve opening degree under a condition that the valve overlap amount increases (rightward in FIG. 14), it is possible to increase an amount of high-temperature combustion gas remaining in a cylinder. As a result, since an in-cylinder gas temperature increases, combustion stability is improved even under a condition that a coolant temperature of an engine is low and the combustion stability is poor, and learning is possible in a stable engine operating state. It is possible to expand a range of the learnable coolant temperature.

Figure 15:
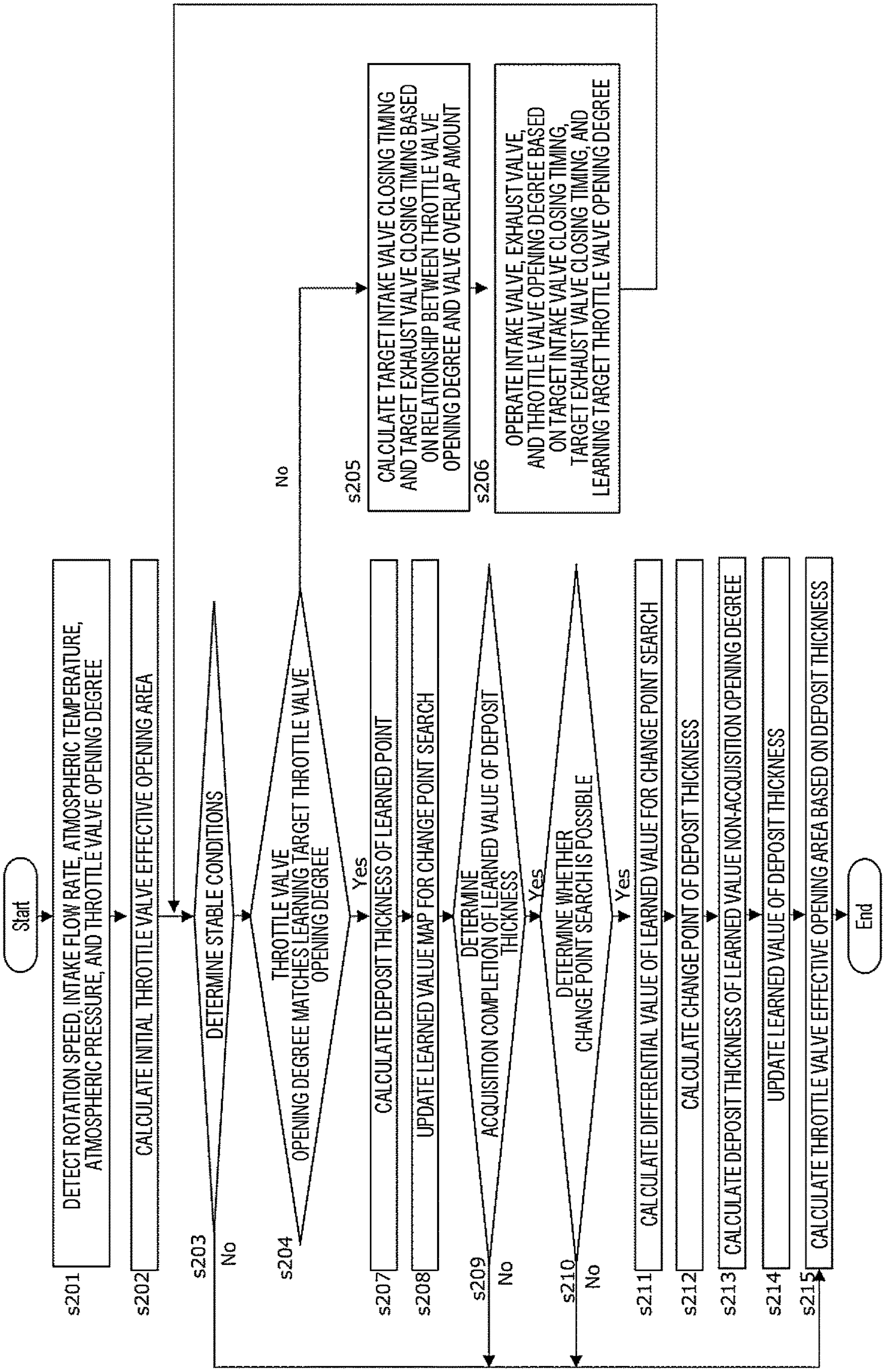
FIG. 15 is a flowchart illustrating learning for a deposit thickness and calculation of a throttle valve effective opening area according to a second embodiment of the present invention.

Next, specific processing of the present embodiment will be described. FIG. 15 is a flowchart illustrating learning of a deposit thickness and correction of a throttle valve effective opening area according to the present embodiment. Details of each step will be described below.

Steps s201 to s203 and steps s207 to s215 are the same processes as steps s101 to s103 and steps s104 to s112 of the first embodiment, and thus description thereof will be omitted.

<<Step s204>>

In step s204, it is determined whether the throttle valve opening degree matches a learning target throttle valve opening degree. Here, a method of comparing a difference between the throttle valve opening degree and the learning target throttle valve opening degree with a threshold is adopted. The learning target throttle valve opening degree is, for example, a minimum opening degree, an intermediate opening degree, and a maximum opening degree in a use range of a preset idle opening degree.

When the determination (s204) is Yes, the process proceeds to s207. When the determination is No, the process proceeds to step s205.

<<Step s205>>

In step s205, a target intake valve closing timing and a target exhaust valve closing timing for achieving the target throttle valve opening degree set in step s204 are calculated based on a relationship between the throttle valve opening degree and the valve "overlap amount," as illustrated in FIG. 14.

<<Step s206>>

In step s206, the intake valve, the exhaust valve, and the throttle valve opening degree are operated so that the target intake valve closing timing, the target exhaust valve closing timing, and the learning target throttle valve opening degree are achieved. Through these operations, combustion stability can be improved while the rotation speed and the output are kept constant. As a result, deterioration of drivability can be prevented, and a learned value of the deposit thickness can be acquired.

After step s206 is completed, the process proceeds to step s203.

As described above, by operating the variable valve mechanism and the throttle valve opening degree included in the internal combustion engine so that the valve overlap amount and the throttle valve opening degree which are angles at which both the intake valve and the exhaust valve are opened have a positive correlation, it is possible to improve combustion stability while keeping the rotation speed and the output constant. Therefore, it is possible to acquire a learned value of the deposit thickness while preventing deterioration in drivability.

Accordingly, since the learned value of the deposit thickness can be acquired at a plurality of opening degrees in the idle state, a throttle valve effective opening area can be calculated with high accuracy. Accordingly, even when a deposit is adhered to the throttle body, an in-cylinder inflow gas flow rate during a transient operation can be calculated with high accuracy. Therefore, the fuel injection amount can be appropriately controlled, and deterioration of fuel consumption and exhaust emission can be prevented.

Main characteristics of the first and second embodiments can also be summarized as follows.

A processor (CPU 40*e*: FIG. 2) of a control device (ECU 0) for an internal combustion engine identifies a first throttle valve opening degree OA and a second throttle valve opening degree $\theta_B$ at which a change rate (differential value) of an index (a deposit thickness, a decrease rate of an effective opening area, a flow rate decrease rate, and the like: FIG. 9) correlated with a decrease rate of an effective opening area of a throttle valve changes (s109: FIG. 10). The processor (CPU 40*e*) estimates the index at any throttle valve opening degree from the first throttle valve opening degree $\theta_A$ and the second throttle valve opening degree $\theta_B$ (s110: FIG. 10), and calculates an effective opening area of the throttle valve from the estimated index (s112: FIG. 10).

Accordingly, it is possible to accurately calculate an effective opening area of the throttle valve in which an influence of the deposit is reflected.

As illustrated in FIG. 9, the index is, for example, a thickness of a deposit accumulated on the throttle body, a flow rate decrease rate of air passing through the throttle valve, or a decrease rate of an effective opening area of the throttle valve. Accordingly, it is possible to calculate the effective opening area of the throttle valve from not only the thickness of the deposit but also the flow rate decrease rate or the decrease rate of the effective opening area.

The processor (CPU 40*e*) estimates that a value D (θ) of the index (for example, a deposit thickness) in a range of a throttle valve opening degree less than the first throttle valve opening degree $\theta_A$ is a constant value equal to the value D ($\theta_A$) of the index in the first throttle valve opening degree $\theta_A$ ((i) in Formula (21)). Accordingly, it is possible to accurately calculate the effective opening area of the throttle valve in the range on the lower opening degree side rather than the first throttle valve opening degree $\theta_A$.

The processor (CPU 40*e*) estimates that the value D (θ) of the index (for example, a deposit thickness) in the range of the throttle valve opening degree greater than the second throttle valve opening degree $\theta_B$ is a constant value equal to the value D ($\theta_B$) of the index in the second throttle valve opening degree $\theta_B$ ((iii) in Formula (21)). Accordingly, it is possible to accurately calculate the effective opening area of the throttle valve in the range on the higher opening degree side rather than the second throttle valve opening degree $\theta_B$.

The processor (CPU 40*e*) estimates the value D (θ) of the index (for example, a deposit thickness) in the range between the first throttle valve opening degree $\theta_A$ and the second throttle valve opening degree $\theta_B$ based on the value D ($\theta_A$) of the index at the first throttle valve opening degree $\theta_A$ and the value D ($\theta_B$) of the index at the second throttle valve opening degree $\theta_B$ ((ii) in Formula (21)). Accordingly, it is possible to accurately calculate the effective opening area of the throttle valve in a range between the first throttle valve opening degree $\theta_A$ and the second throttle valve opening degree $\theta_B$.

In the present embodiment, the throttle valve opening degree and the index value (for example, a deposit thickness) in the range between the first throttle valve opening degree $\theta_A$ and the second throttle valve opening degree $\theta_B$ have a linear relationship ((ii) in Formula (21)). Accordingly, it is possible to calculate the effective opening area of the throttle valve using the linear relationship.

The processor (CPU 40*e*) identifies the first throttle valve opening degree $\theta_A$ based on the minimum throttle valve opening degree $M_{min}$ and identifies the second throttle valve opening degree $\theta_B$ based on the maximum throttle valve opening degree $M_{max}$ in the throttle valve opening degree when the change rate dD/dθ of the index (for example, a deposit thickness) to the throttle valve opening degree is within a predetermined range (for example, dD/dθ≥predetermined value $L_1$) (s109: FIG. 10). Accordingly, it is possible to identify the first throttle valve opening degree $\theta_A$ and the second throttle valve opening degree $\theta_B$ within a predetermined range.

In the present embodiment, the predetermined range is a range where the change rate dD/dθ of the index with respect to the throttle valve opening degree is the predetermined value $L_1$ or more. Accordingly, it is possible to narrow the range where the first throttle valve opening degree $\theta_A$ and the second throttle valve opening degree $\theta_B$ are searched for.

The processor (CPU 40*e*) calculates a weighted average value of the previous value and the current value of the index (for example, deposit thickness) as a learned value of the index (s105, FIG. 10). Accordingly, it is possible to reduce an influence of an abnormal value.

The processor (CPU 40*e*) determines whether the acquisition of the learned value of the index is completed based on the number of times the index is calculated and a difference between a travel distance at the time of calculation of the index and a current travel distance (s106, FIG. 10). As a result, it is possible to improve the reliability of the learned value of the index.

The processor (CPU 40*e*) identifies the first throttle valve opening degree $\theta_A$ and the second throttle valve opening degree $\theta_B$ from the throttle valve opening degree (for example, $\theta_1$, $\theta_2$, and the like) corresponding to the learned value of the index when the learned value of the index (for example, a deposit thickness) of which acquisition is completed is at least one in a predetermined range of the throttle valve opening degree ($\theta_C$≤θ≤ $\theta_D$) (FIGS. 11B and 11C). Accordingly, when the number of learned values of the index is at least one, the first throttle valve opening degree $\theta_A$ and the second throttle valve opening degree $\theta_B$ can be identified.

The processor (CPU 40*e*) identifies the first throttle valve opening degree $\theta_A$ and the second throttle valve opening degree $\theta_B$ based on a throttle valve opening degree $\theta_1$ corresponding to the learned value D ($\theta_1$) of the index (for example, a deposit thickness) when there is only one learned value of the index ($\theta_C$≤θ≤$\theta_D$) acquired in a predetermined range of the throttle valve opening degree ($\theta_C$≤θ≥$\theta_D$) (FIG. 11B). Accordingly, even when number of learned values of the index is one, the first throttle valve opening degree $\theta_A$ and the second throttle valve opening degree $\theta_B$ can be identified.

The processor (CPU 40*e*) learns the index (for example, a deposit thickness) and the throttle valve opening degree corresponding to the index by controlling the throttle valve, the variable intake valve, and the variable exhaust valve so that the valve overlap amount increases as the throttle valve opening degree increases (FIG. 14) (s206: FIG. 15).

Accordingly, it is possible to learn the index and the throttle valve opening degree corresponding to the index while maintaining a rotation speed and an output torque.

The present invention is not limited to the above-described embodiments and includes various modifications. For example, the above-described embodiments have been described in detail to facilitate understanding of the present invention, and are not necessarily limited to those having all the described configurations. Some of the configurations of one embodiments can be replaced with configurations of another embodiment, and configurations of another embodiment can be added to the configurations of one embodiment. It is possible to add, delete, and replace other configurations to, from and with configurations of each embodiment.

Some or all of the above-described configurations, functions, and the like may be realized by hardware, for example, by designing with an integrated circuit. Each of the foregoing configurations, functions, and the like may be realized by software by causing a processor to interpret and execute a program for realizing each function. Information such as a program, a table, and a file for realizing each function can be stored in a recording device such as a memory, a hard disk, and a solid state drive (SSD), or a recording medium such as an IC card, an SD card, and a DVD.

Embodiments of the present invention may have the following aspects.

[1]. A control device for an internal combustion engine includes: a decrease rate correlation index calculation unit that calculates an index correlated with a decrease rate of a throttle valve effective opening area with respect to a flow direction in first and second throttle valve opening degrees based on an opening degree of a throttle valve provided in an intake path of the internal combustion engine and a rotation speed of the internal combustion engine, an amount of intake air passing through the throttle valve, an upstream pressure of the throttle valve, a downstream pressure of the throttle valve, and an atmospheric temperature when a predetermined learning condition is satisfied; and a throttle valve effective opening calculation unit that calculates the throttle valve area effective opening area based on the index. The control device includes a change point calculation unit that determines the first and second throttle valve opening degrees based on a change in the index with respect to the throttle valve opening degree.

[2]. The control device for the internal combustion engine according to [1], wherein the index is a thickness of a deposit accumulated on a throttle body, a flow rate decrease rate, or a decrease rate of a throttle valve effective opening area.

[3]. The control device for the internal combustion engine according to [2], wherein a value of the index at a throttle valve opening degree less than the first throttle valve opening degree is equal to a value of the index at the first throttle valve opening degree.

[4]. The control device for the internal combustion engine according to [3], wherein a value of the index at a throttle valve opening degree greater than the second throttle valve opening degree is equal to a value of the index at the second throttle valve opening degree.

[5]. The control device for the internal combustion engine according to [4], wherein the value of the index at the throttle valve opening degree in the range of the first and second throttle valve opening degrees is calculated based on the value of the index at the first throttle valve opening degree and the value of the index at the second throttle valve opening degree.

[6]. The control device for the internal combustion engine according to [5], wherein, at a throttle valve opening degree at which a change in the index with respect to the throttle valve opening degree is within a predetermined range, a minimum opening is the first throttle valve opening degree and a maximum opening is the second throttle valve opening degree.

[7]. The control device for the internal combustion engine according to [6], wherein a weighted average value of a previous value and a current value of the index is calculated as a learned value of the index.

[8]. The control device for the internal combustion engine according to [7], wherein whether acquisition of the learned value of the index is completed is determined based on the number of times the index is calculated and a difference between a travel distance at the time of calculation of the index and a current travel distance.

[9]. The control device for the internal combustion engine according to [8], wherein it is determined that the first and second throttle valve opening degrees can be searched for when the learned value of the index can be acquired as at least one point in the predetermined range of the throttle valve opening degree.

[10]. The control device for the internal combustion engine according to [9], wherein, when the number of points at which the learned value of the index is acquired is one in the range of the predetermined throttle valve opening degree, the first throttle valve opening degree, and the second throttle valve opening degree are calculated as the predetermined throttle valve opening degree, and the indexes of the first and second throttle valve opening degrees are calculated based on the learned value at the point at which the learned value is acquired.

[11] The control device for the internal combustion engine according to [10], wherein, when the index is calculated, the throttle valve opening degree and an intake valve opening/closing timing are operated within a range where the rotation speed falls within a predetermined range.

According to [1] to [11], it is possible to accurately calculate the throttle valve effective opening area in the throttle valve opening degree region in which a throttle valve opening degree is equal to or greater than the throttle valve opening degree in an idle state. Accordingly, even when a deposit is adhered, a throttle valve passage gas flow rate can be calculated with high accuracy. As a result, since an in-cylinder inflow gas flow rate can be calculated with high accuracy, an appropriate fuel injection amount can be controlled, and fuel consumption and exhaust emission can be prevented from deteriorating.

REFERENCE SIGNS LIST

100 engine (internal combustion engine)
0 ECU
1 accelerator opening degree sensor
3 intake flow rate sensor
4 supercharger
5 intercooler
6 throttle valve
8 intake pipe
9*a* variable intake valve
9*b* variable exhaust valve
10 fuel injection device
11 ignition plug
12 crank angle sensor
13 combustion chamber
14 exhaust pipe
15 intake air temperature sensor
16 atmospheric pressure sensor
20 air-fuel ratio sensor
21 catalyst converter
30 EGR cooler
31 EGR valve
32 EGR pipe

The invention claimed is:

1. A control device for an internal combustion engine comprising a processor configured to:

identify first and second throttle valve opening degrees at which a change rate of an index correlated with a decrease rate of an effective opening area of a throttle valve changes;

estimate the index at an arbitrary throttle valve opening degree from the first and second throttle valve opening degrees;

calculate an effective opening area of a throttle valve from the estimated index;

estimate a value of the index in a range of a throttle valve opening degree less than the first throttle valve opening degree as a constant value equal to a value of the index in the first throttle valve opening degree:

estimate a value of the index in a range of a throttle valve opening degree greater than the second throttle valve opening degree as a constant value equal to a value of the index in the second throttle valve opening degree;

estimate a value of the index in a range between the first and second throttle valve opening degrees based on the value of the index in the first throttle valve opening degree and the value of the index in the second throttle valve opening degree;

identify the first throttle valve opening degree based on a minimum throttle valve opening degree and identifies the second throttle valve opening degree based on a maximum throttle valve opening degree in a throttle valve opening degree in which a change rate of the index with respect to the throttle valve opening degree is within a predetermined range;

calculate a weighted average value of a previous value and a current value of the index as a learned value of the index; and wherein the processor learns the index and a throttle valve opening degree corresponding to the index by controlling the throttle valve, the variable intake valve, and the variable exhaust valve so that a valve overlap amount increases as the throttle valve opening degree increased.

2. The control device for the internal combustion engine according to claim 1, wherein the index is a thickness of a deposit accumulated on a throttle body, a flow rate decrease rate of air passing through the throttle valve, or a decrease rate of an effective opening area of the throttle valve.

3. The control device for the internal combustion engine according to claim 1, wherein the processor determines whether acquisition of the learned value of the index is completed based on a number of times the index is calculated and a difference between a travel distance at a time of calculation of the index and a current travel distance.

4. The control device for the internal combustion engine according to claim 3, wherein the processor identifies the first and second throttle valve opening degrees from a throttle valve opening degree corresponding to a learned value of the index when there is at least one learned value of the index of which the acquisition has been completed in a range of a predetermined throttle valve opening degree.

5. The control device for the internal combustion engine according to claim 4, wherein the processor identifies the first and second throttle valve opening degrees based on a throttle valve opening degree corresponding to the learned value of the index when there is only one learned value of the index of which the acquisition is completed in the range of the predetermined throttle valve opening degree.

6. The control device for the internal combustion engine according to claim 1, wherein a throttle valve opening degree and a value of the index in a range between the first and second throttle valve opening degrees have a linear relationship.

7. The control device for the internal combustion engine according to claim 1, wherein the predetermined range is a range where a change rate of the index with respect to the throttle valve opening degree is a predetermined value or more.

* * * * *